United States Patent
Saito

(10) Patent No.: US 8,687,919 B2
(45) Date of Patent: *Apr. 1, 2014

(54) IMAGE PROCESSING APPARATUS, COMPUTER READABLE MEDIUM, AND IMAGE PROCESSING METHOD

(75) Inventor: Kazuo Saito, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 221 days.

This patent is subject to a terminal disclaimer.

(21) Appl. No.: 13/193,099

(22) Filed: Jul. 28, 2011

(65) Prior Publication Data

US 2012/0189210 A1    Jul. 26, 2012

(30) Foreign Application Priority Data

Jan. 20, 2011    (JP) ................................. 2011-009987

(51) Int. Cl.
*H04N 1/40*    (2006.01)
*G06K 9/36*    (2006.01)

(52) U.S. Cl.
USPC ............................ 382/284; 358/1.9; 358/468

(58) Field of Classification Search
USPC .......... 382/188, 209, 284, 294, 312; 715/507, 715/508, 512, 541
See application file for complete search history.

(56) References Cited

U.S. PATENT DOCUMENTS

| | | | |
|---|---|---|---|
| 7,231,601 B2 | 6/2007 | Sako et al. | |
| 7,933,450 B2 * | 4/2011 | Furuki | 382/188 |
| 2002/0065853 A1 * | 5/2002 | Takahashi et al. | 707/527 |
| 2003/0229859 A1 * | 12/2003 | Shiraishi et al. | 715/541 |
| 2004/0035935 A1 * | 2/2004 | Takahashi et al. | 235/462.09 |
| 2004/0085301 A1 * | 5/2004 | Furukawa et al. | 345/179 |
| 2004/0160430 A1 * | 8/2004 | Tokunaga et al. | 345/179 |
| 2005/0120295 A1 * | 6/2005 | Sako et al. | 715/507 |
| 2012/0105917 A1 * | 5/2012 | Saito | 358/448 |
| 2012/0182232 A1 * | 7/2012 | Saito et al. | 345/173 |

FOREIGN PATENT DOCUMENTS

| | | |
|---|---|---|
| JP | 6-75795 A | 3/1994 |
| JP | 6-103390 A | 4/1994 |
| JP | 2003-263267 A | 9/2003 |

* cited by examiner

*Primary Examiner* — Andrae S Allison
(74) *Attorney, Agent, or Firm* — Sughrue Mion, PLLC

(57) ABSTRACT

An image processing apparatus includes an image output apparatus and an image reading apparatus. The image output apparatus includes an input object information receiving unit that receives first input object information, a first information image generating unit that generates a first information image, a second information image generating unit that generates a second information image, a first combining unit that combines the first information image with a document, a second combining unit that combines the second information image with a document, and a first output unit that outputs the document. The image reading apparatus includes a first reading unit that reads an information image including first input object information, a second reading unit that reads an information image including second input object information, an extracting unit that extracts the first and second input object information, and a determining unit that determines whether these pieces of information correspond to each other.

12 Claims, 19 Drawing Sheets

FIG. 7

| INPUT FIELD ID | INPUT OBJECT INFORMATION |
|---|---|
| INPUT FIELD a | Q. 1 |
| INPUT FIELD b | Q. 2 |
| INPUT FIELD c | Q. 3 |
| ... | ... |

FIG. 8

| DOCUMENT ID | PAGE ID | INPUT OBJECT INFORMATION |
|---|---|---|
| 12345 | 1 | QUESTION 1-1 |

FIG. 9

| DOCUMENT ID | INPUT OBJECT INFORMATION |
|---|---|
| ABCD | QUESTION A |

FIG. 10

| INPUT FIELD ID | POSITION | HEIGHT | WIDTH |
|---|---|---|---|
| INPUT FIELD a | (Xa, Ya) | H | W |
| INPUT FIELD b | (Xb, Yb) | H | W |
| INPUT FIELD c | (Xc, Yc) | H | W |
| ... | ... | ... | ... |

PATTERN 0

PATTERN 1

FIG. 14
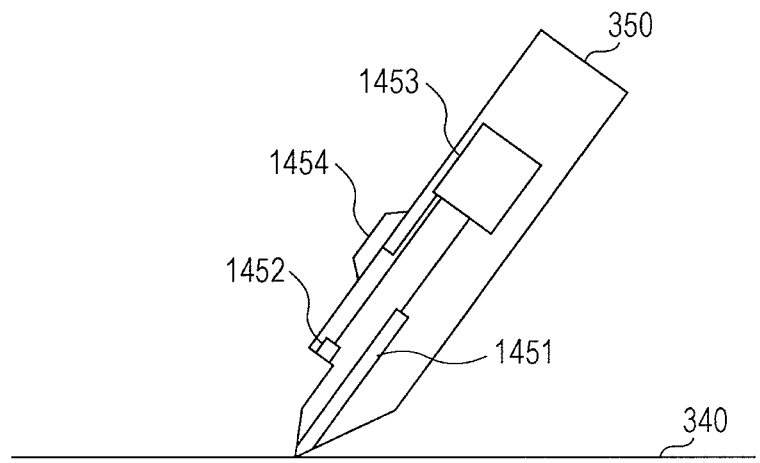
FIG. 15
| DOCUMENT ID | X COORDINATE | Y COORDINATE |
|---|---|---|
| 12345 | 100 | 100 |
| 12345 | 104 | 100 |
| 12345 | 105 | 102 |
| ... | ... | ... |
FIG. 16
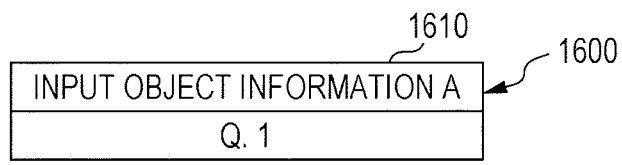

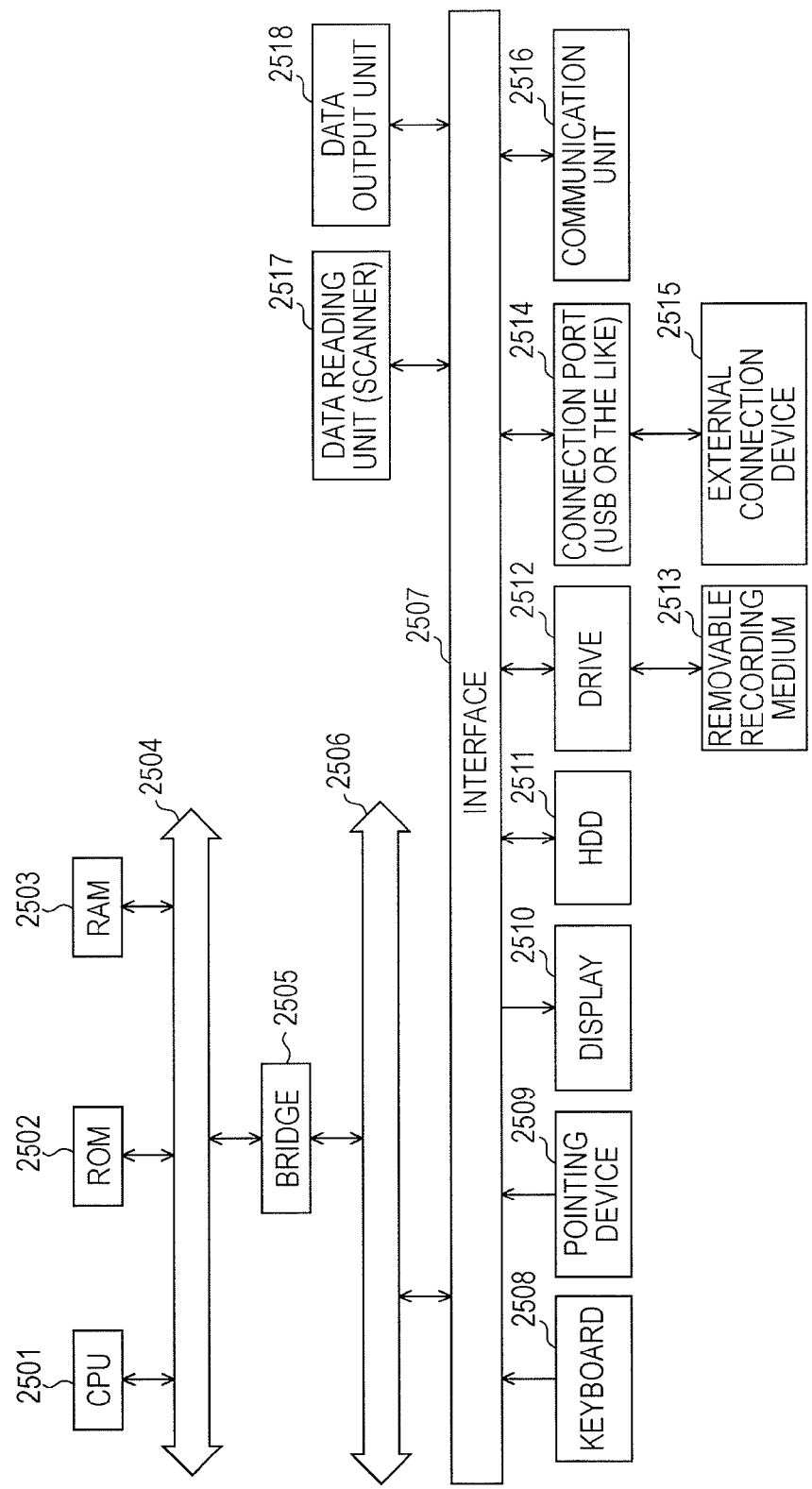

IMAGE PROCESSING APPARATUS, COMPUTER READABLE MEDIUM, AND IMAGE PROCESSING METHOD

CROSS-REFERENCE TO RELATED APPLICATIONS

This application is based on and claims priority under 35 USC 119 from Japanese Patent Application No. 2011-009987 filed Jan. 20, 2011.

BACKGROUND (i) Technical Field

The present invention relates to an image processing apparatus, a computer readable medium, and an image processing method.

(ii) Related Art

There are technologies related to a configuration of an information image placed on a recording medium and control of reading information written on a recording medium on which an information image is placed.

SUMMARY

According to an aspect of the invention, there is provided an image processing apparatus including an image output apparatus and an image reading apparatus. The image output apparatus includes an input object information receiving unit that receives first input object information, which is information about an input object in a document, a first information image generating unit that generates a first information image, which is an image representing information, on the basis of the first input object information received by the input object information receiving unit, a second information image generating unit that generates a second information image, which is an image representing information, on the basis of position information representing a position in the document and second input object information corresponding to the first input object information received by the input object information receiving unit, a first combining unit that combines the first information image generated by the first information image generating unit with the document, a second combining unit that combines the second information image generated by the second information image generating unit with a document, and a first output unit that outputs the document combined with the first information image by the first combining unit and the document combined with the second information image by the second combining unit onto respective media, or that outputs a document combined with the first information image and the second information image onto a medium. The image reading apparatus includes a first reading unit that reads an information image that has been output onto a medium by the image output apparatus and that includes first input object information, a second reading unit that reads an information image that has been output onto a medium by the image output apparatus and that includes position information and second input object information, an extracting unit that analyzes the information image read by the first reading unit and the information image read by the second reading unit, thereby extracting the first input object information and the second input object information, and a determining unit that compares the first input object information and the second input object information extracted by the extracting unit, thereby determining whether or not the second input object information corresponds to the first input object information.

BRIEF DESCRIPTION OF THE DRAWINGS

Exemplary embodiment(s) of the present invention will be described in detail based on the following figures, wherein:

FIG. 7 is an explanatory diagram illustrating an example data structure of an input field/input object information table;

FIG. 8 is an explanatory diagram illustrating an example data structure of a document/page/input object information table;

FIG. 9 is an explanatory diagram illustrating an example data structure of a document/input object information table;

FIG. 10 is an explanatory diagram illustrating an example data structure of a document layout table;

FIG. 14 is an explanatory diagram illustrating a first example structure of a digital pen;

FIG. 15 is an explanatory diagram illustrating an example data structure of a stroke information table;

FIG. 16 is an explanatory diagram illustrating an example data structure of an input object information table;

FIG. 25 is a block diagram illustrating an example hardware configuration of a computer that realizes the exemplary embodiment.

DETAILED DESCRIPTION

Hereinafter, various exemplary embodiments of the present invention will be described with reference to the attached drawings.

Figure 1:
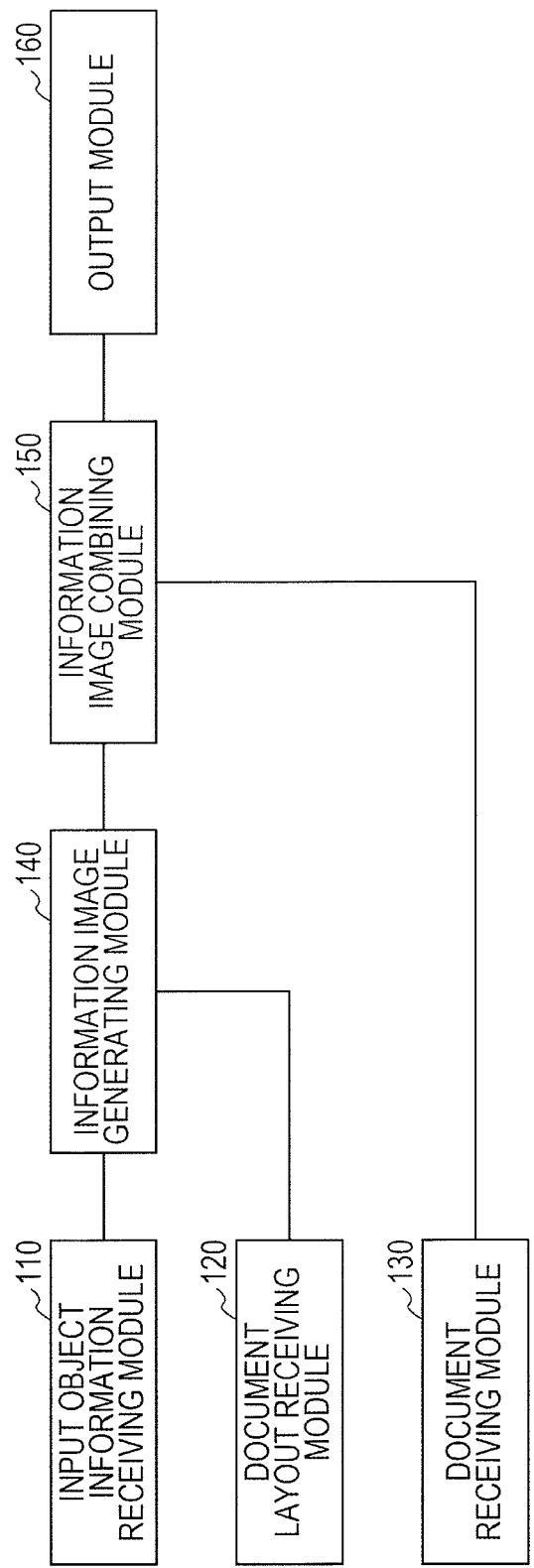
FIG. 1 is a conceptual module configuration diagram illustrating an example configuration of an image output apparatus according to an exemplary embodiment of the present invention.

FIG. 1 is a conceptual module configuration diagram illustrating an example configuration of an image output apparatus according to an exemplary embodiment.

In general, "modules" are components of software (computer program) or hardware that may be logically separated from one another. Accordingly, the modules according to the exemplary embodiment correspond to not only modules in a computer program but also modules in a hardware configuration. Therefore, the description of the exemplary embodiment includes a description of a computer program for causing a computer to function as those modules (a program for causing a computer to execute individual program steps, a program for causing a computer to function as individual units, or a program for causing a computer to realize individual functions), a system, and a method. For the convenience of description, expressions "store", "cause . . . to store", and expressions equivalent thereto will be used. These expressions specifically mean "cause a storage device to store" or "perform control to cause a storage device to store" in the case of a computer program. The modules may correspond to functions in a one-to-one relationship. In terms of packaging, a single module may be constituted by a single program, plural modules may be constituted by a single program, or a single module may be constituted by plural programs. Also, plural modules may be executed by a single computer, or a single module may be executed by plural computers in a distributed or parallel environment. Alternatively, a single module may include another module. Hereinafter, "connection" is used to refer to a logical connection (transmission and reception of data, an instruction, a reference relationship between pieces of data, etc.), as well as a physical connection. "Predetermined" means being determined before a certain operation, and includes the meaning of being determined in accordance with a present situation/state or in accordance with a previous situation/state before a certain operation after processing according to the exemplary embodiment starts, as well as before processing according to the exemplary embodiment starts.

A system or apparatus may be realized by plural computers, hardware units, devices, or the like connected to one another via a communication medium, such as a network (including communication connections having a one-to-one correspondence), or may be realized by a single computer, hardware unit, device, or the like. "Apparatus" and "system" are used synonymously. Of course, "system" does not include a man-made social "organization" (social system).

Also, target information is read from a storage device in individual processing operations performed by respective modules or in individual processing operations performed by a single module. After each processing operation has ended, the processing result thereof is written into the storage device. Thus, a description of reading from the storage device before a processing operation and writing into the storage device after a processing operation will be omitted. Here, examples of the storage device include a hard disk, a random access memory (RAM), an external storage medium, a storage device connected through a communication line, a register in a central processing unit (CPU), and the like.

The image processing apparatus (image output apparatus) according to the exemplary embodiment combines an information image with a document and outputs a resulting object. As illustrated in FIG. 1, the image output apparatus includes an input object information receiving module 110, a document layout receiving module 120, a document receiving module 130, an information image generating module 140, an information image combining module 150, and an output module 160.

The information image is an image code that is systematically created for representing electronic data in a machine readable manner. A specific example thereof will be described below with reference to FIGS. 11A to 11C.

The document receiving module 130 is connected to the information image combining module 150. The document receiving module 130 receives a document to be combined with an information image, and supplies the document to the information image combining module 150. Here, the document includes text data, electronic data of figures and images in some cases, or a combination of text data and electronic data. The document is a target of outputting (e.g., printing), storing, editing, searching, and so forth, may be transmitted/received as an independent unit between systems or users, and includes equivalents thereof. Examples of receiving a document include receiving an electronic document created using a document creating application, reading an image using a scanner, camera, or the like, receiving an image using a facsimile machine or the like from an external device via a communication line, and reading an electronic document stored in a hard disk or the like (including a hard disk incorporated into the image processing apparatus and a hard disk connected to the image processing apparatus via a network). An image of the document may either be a binary image or a multilevel image (including a color image). The number of pages of received images may either be one or plural.

The number of received documents may either be one or plural. Examples of plural documents include document A and document B. Document A is a document which has a region showing an input object (hereinafter referred to as an object region), and is a document combined with an information image embedded with information about an input object (first input object information). More specifically, document A corresponds to the documents illustrated in FIGS. 4A, 4B, and 6A (described below). On the other hand, document B is a document which has an input region (also referred to as an input field) corresponding to the foregoing input object, and is a document combined with an information image embedded with input object information corresponding to the first input object information (second input object information). More specifically, document B corresponds to the documents illustrated in FIGS. 5A, 5B, and 6B (described below). In the case of a single document, the document is combined with the foregoing two information images (the information image embedded with the first input object information and the information image embedded with the second input object information).

In the case of plural documents, the following combination of documents is available: a question sheet (document A) and an answer sheet (document B); a sticker having a device management number printed thereon (document A) and a maintenance log (document B); etc. Documents A (question sheet, sticker, etc.) have an object region. Documents B (answer sheet, maintenance log, etc.) have an input field in which information is to be manually written by a user. In the case of a single document, examples of the document include a sheet including both questions and answer fields, a sticker including the content of a maintenance log, etc. Typically, an input field is a rectangular region defined by a line. Alternatively, the input field may be a region defined by parentheses, or may be a blank region without a definite partition. The blank region may be a blank region having a predetermined area or more, or may be an entire page or an entire document formed of plural pages. The information input to the input field may be characters, symbols such as a tick, figures, or the like as long as the information is written using a digital pen (writing tool) described below.

Hereinafter, a description will be given of the case of handling plural documents (document A and document B). Alternatively, a single document constituted by a combination of document A and document B may be applied.

The document layout receiving module 120 is connected to the information image generating module 140. The document layout receiving module 120 receives information about the layout of a document received by the document receiving module 130, and supplies the layout information to the information image generating module 140. Here, the layout information includes at least information representing the position and size of a region having an input object described therein (object region) in the case of document A, and includes at least information representing the position and size of an input field in the case of document B. Alternatively, the layout information may include information representing the positions and sizes of a region having an input object described therein and document components (title, paragraph, figure, table, etc.) other than the input field.

The input object information receiving module 110 is connected to the information image generating module 140. The input object information receiving module 110 receives first input object information, which is information about an input object in a document. Also, the input object information receiving module 110 may receive second input object information. Alternatively, the input object information receiving module 110 may receive first input object information and then generate second input object information using the first input object information.

Here, the first input object information (input object information embedded in an information image combined with document A) may be information about an input object (in the foregoing examples, a question corresponding to an answer field, a device represented by a management number corresponding to the maintenance log, that is, content to be input is information about an input object) in a case where the information is input using a writing tool. Specifically, the following information corresponds to the first input object information.

(A1) The first input object information may be identification information that uniquely identifies an input object in document A in the system illustrated in FIG. 3 (described below). For example, a question number corresponds thereto in the case of a question sheet, and a management number corresponds thereto the case of the foregoing sticker.

(A2) The first input object information may be information representing attributes of an input object in document A (name, date and time of creation, size, position, etc.).

Figure 3:
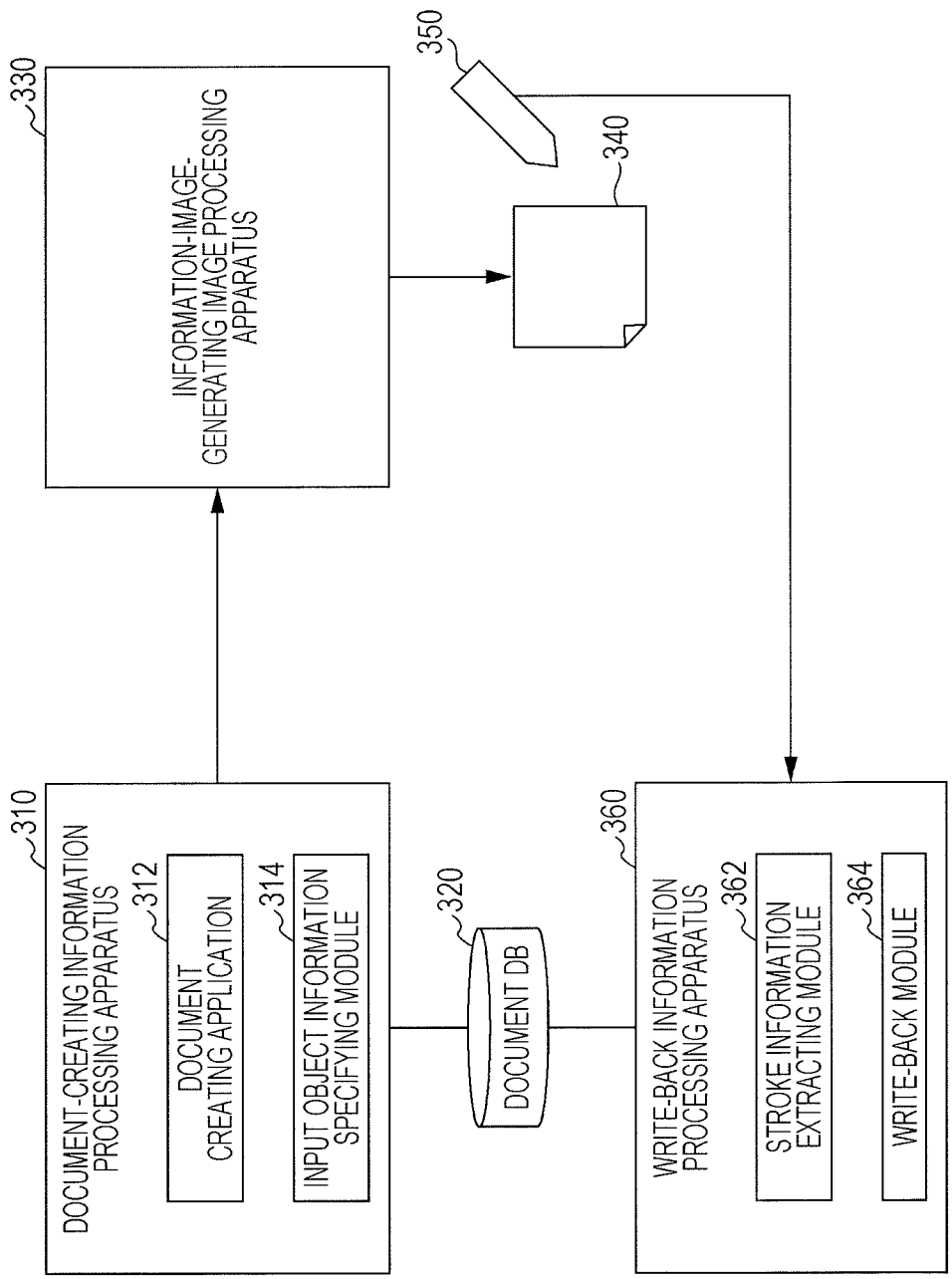
FIG. 3 is an explanatory diagram illustrating an example system configuration for realizing the exemplary embodiment.

(A3) The first input object information may be document identification information that uniquely identifies document A in the system illustrated in FIG. 3. For example, document identifiers (IDs) correspond thereto, such as a uniform resource identifier (URI) and a uniform resource locator (URL).

(A4) The first input object information may be page identification information that uniquely identifies a page of document A in the system illustrated in FIG. 3. For example, a combination of a document ID and a page number corresponds thereto.

(A5) The first input object information may be identification information that uniquely identifies an input field to which an input object is to be input in the system illustrated in FIG. 3. The identification information about an input field may be the above-described pieces of information (A1) to (A4) for an input field.

(A6) The first input object information may include predetermined information representing that an input object is not specified. Hereinafter, such information will be referred to as "ANY".

(A7) The first input object information may be a combination of these pieces of information (a combination using a logical operator, such as AND, OR, NOT, etc.).

As for specification of the first input object information, specification using a mouse, keyboard, touch panel, or the like of a user may be received. Alternatively, first input object information that is predetermined in each field may be received.

The second input object information may be information corresponding to the first input object information. Examples of the second input object information are as follows.

(B1) The second input object information may be the first input object information itself. That is, determining whether or not the first input object information and the second input object information correspond to each other means determining whether or not both have the same value.

(B2) In a case where the first input object information has a hierarchical structure, the second input object information is input object information that is in the lower layer of or in the same layer as the first input object information. That is, determining whether or not the first input object information and the second input object information correspond to each other means determining whether or not the first input object information is in the upper layer of or in the same layer as the second input object information and the second input object information is in the lower layer of or in the same layer as the first input object information in the hierarchical structure.

(B3) In a case where the first input object information is a set, the second input object information is input object information included in the first input object information. That is, determining whether or not the first input object information and the second input object information correspond to each other means determining whether or not the second input object information is included in the set of the first input object information.

(B4) In a case where the first input object information is "ANY" and where the second input object information is "ANY", the correspondence in the above-described form (B1) is applied. In a case where the first input object information is "ANY" and where the second input object information is none, it is determined that the second input object information corresponds to the first input object information. In a case where the first input object information is "ANY" and where the second input object information is information other than "ANY" (information other than none, that is, second input object information corresponding to any first input object information), it is determined that the second input object information does not correspond to the first input object information. In this case, "a user is going to input information into a region where an input object is specified" although "an input object is not specified".

(B5) The form of correspondence between the first input object information and the second input object information may be a combination of the above-described forms (a combination using a logical operator, such as AND, OR, NOT, etc.).

As for specification of the second input object information, specification using a mouse, keyboard, touch panel, or the like of a user may be received. Alternatively, second input object information that is predetermined in each field may be received. Also, the second input object information may be generated using the first input object information.

The information image generating module 140 is connected to the input object information receiving module 110, the document layout receiving module 120, and the information image combining module 150. The information image generating module 140 generates an information image, which is an image representing information, on the basis of position information representing a position in the document received by the document receiving module 130 and the first input object information or second input object information received by the input object information receiving module 110. That is, the information image generating module 140 generates a first information image on the basis of the first input object information received by the input object information receiving module 110. Then, the information image generating module 140 generates a second information image, which is an image representing information, on the basis of the position information representing a position in the document and the second input object information corresponding to the first input object information received by the input object information receiving module 110.

The information image generating module 140 generates an information image to be combined into an object region or an input field using the layout information received by the document layout receiving module 120 (specifically, information representing the position and size of the object region or input field) and the first input object information or second input object information. The foregoing "on the basis of" means embedding information including at least the position information and "the first input object information or second input object information" in an information image so that the position information and "the first input object information or second input object information" may be read when the information image is analyzed. In the case of the foregoing document A, the position information is not always necessary, and only the first input object information may be used. The position information embedded in an information image is information that enables, when the information image embedded with the position information thereof is read by a digital pen, the trail of the digital pen to be reproduced. For example, XY coordinates or the like in the document correspond to the position information. Specifically, a set of XY coordinates in the document representing a region determined by the position and size of the object region or input field corresponds to the position information.

Also, the information image generating module 140 may generate an information image further on the basis of document information representing a document. A document ID, a page ID, etc. correspond to the document information. The document ID, the page ID, etc. will be described below with reference to FIG. 3.

The information image combining module 150 is connected to the document receiving module 130, the information image generating module 140, and the output module 160. The information image combining module 150 combines an information image generated by the information image generating module 140 with an object region in document A or an input field in document B received by the document receiving module 130. That is, the information image combining module 150 combines a first information image generated by the information image generating module 140 with a document (document A or a document including both document A and document B). Then, the information image combining module 150 combines a second information image generated by the information image generating module 140 with a document (document B or a document including both document A and document B).

Of course, an information image may be combined with a region other than a region where an input object is described, or a region other than an input field. The information image combined with a region other than a region where an input object is described, or a region other than an input field, may include first input object information or second input object information "ANY". As described above, there is a possibility that an entire page or an entire document is used as the input field. In that case, an information image including the second input object information is combined with the entire page or the entire document.

The output module 160 is connected to the information image combining module 150. The output module 160 outputs, onto a medium, a document with which an information image is combined by the information image combining module 150. That is, the output module 160 outputs document A combined with a first information image by the information image combining module 150 and document B combined with a second information image by the information image combining module 150 onto respective media (in this case, two media (a medium for document A and a medium for document B)), or outputs a document combined with the first and second information images onto a medium (in this case, one medium (a medium for a document including document A and document B)). Examples of outputting a document include printing an image using a printing apparatus such as a printer, transmitting an image using an image transmitting apparatus such as a facsimile machine, and the like. Also, examples of outputting a document include displaying an image on a display apparatus such as a display, writing an image into an image storage apparatus such as an image database, storing an image in a storage medium such as a memory card, and supplying an image to another information processing apparatus. That is, the document is finally output onto a paper or plastic medium so that writing may be performed thereon using a digital pen.

Figure 2:
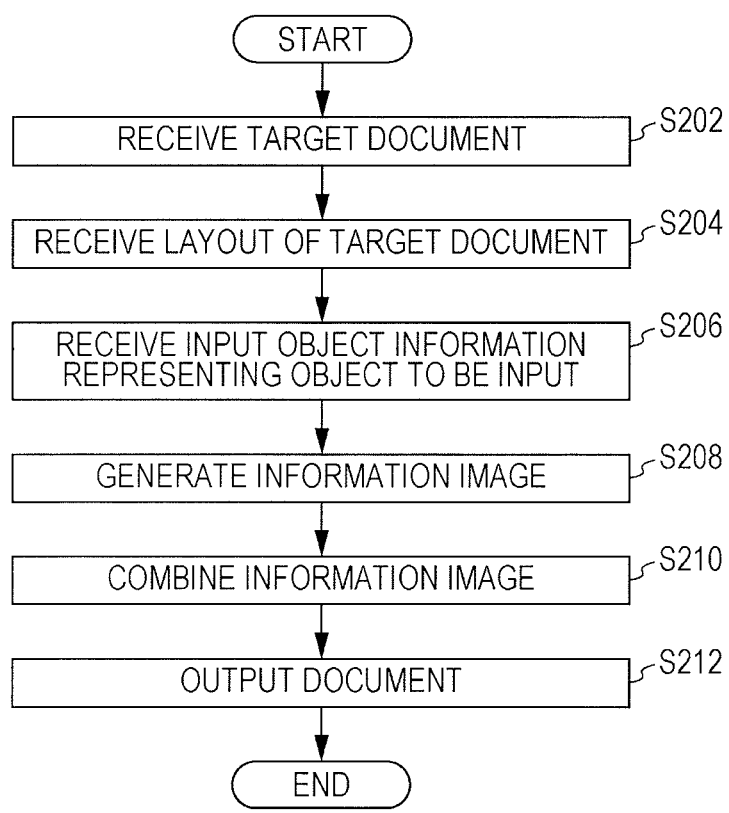
FIG. 2 is a flowchart illustrating an example of processing performed by the image output apparatus according to the exemplary embodiment.

FIG. 2 is a flowchart illustrating an example of processing performed by the image output apparatus according to the exemplary embodiment. In this example, document B is output. As for document A, an input field may be replaced by an object region.

In step S202, the document receiving module 130 receives a target document.

In step S204, the document layout receiving module 120 receives the layout of the target document (at least the position and size of an input field).

In step S206, the input object information receiving module 110 receives input object information representing an object to be input to an input field in the target document.

In step S208, the information image generating module 140 generates an information image including the position of the input field and the input object information.

In step S210, the information image combining module 150 combines the information image with the input field in the target document.

In step S212, the output module 160 outputs the document with which the information image has been combined.

FIG. 3 is an explanatory diagram illustrating an example system configuration for realizing the exemplary embodiment. This system includes a document-creating information processing apparatus 310, a document database (DB) 320, an information-image-generating image processing apparatus 330, a digital pen 350, and a write-back information processing apparatus 360. In order to determine whether or not second input object information in an information image read by the digital pen 350 corresponds to first input object information in an information image that has already been read, the system may include at least the digital pen 350. In order to output, onto a medium, a document enabling determination of whether or not the second input object information in the information image read by the digital pen 350 corresponds to the first input object information in the information image that has already been read, the system may include at least the information-image-generating image processing apparatus 330.

The following processing is performed in this system. That is, an information image including position information (co-ordinate information) is superimposed on an electronic document, and the electronic document is printed by the information-image-generating image processing apparatus 330. The printed document is read by the digital pen 350, which includes a compact camera, so that hand-written information is accumulated as stroke information in the digital pen 350. When the digital pen 350 is connected to the write-back information processing apparatus 360, such as a personal computer (PC), using a universal serial bus (USB) or the like, a stroke information extracting module 362 and a write-back module 364 in the write-back information processing apparatus 360 extract the stroke information from the digital pen 350, specify the original electronic document on the basis of a document ID, and write back the stroke information to the electronic document. Alternatively, the digital pen 350 may transmit the stroke information to the write-back information processing apparatus 360 through wireless communication.

The document-creating information processing apparatus 310 includes a document creating application 312 and an input object information specifying module 314, and is connected to the document DB 320 and the information-image-generating image processing apparatus 330.

The document creating application 312 is an application program for creating an electronic document and causing the information-image-generating image processing apparatus 330 to print a document-with-information-image 340, to which information is to be added by hand writing.

The input object information specifying module 314 specifies first input object information or second input object information for an object region or an input field. For example, the input object information specifying module 314 supplies an input field/input object information table 700 (see FIG. 7) to the information-image-generating image processing apparatus 330. Accordingly, the input object information receiving module 110 in the information-image-generating image processing apparatus 330 receives the input field/input object information table 700. FIG. 7 is an explanatory diagram illustrating an example data structure of the input field/input object information table 700. The input field/input object information table 700 includes an input field ID column 710 and an input object information column 720. The input field ID column 710 stores object region IDs or input field IDs, which serve as information for uniquely identifying object regions or input fields in the system illustrated in FIG. 3. The input object information column 720 stores first input object information or second input object information corresponding to the object regions or input fields.

Alternatively, the input object information specifying module 314 may supply a document/page/input object information table 800 (see FIG. 8) to the information-image-generating image processing apparatus 330, instead of the input field/input object information table 700. In this case, an entire page serves as an object region or an input field, and first input object information or second input object information is specified for the entire page. Accordingly, the input object information receiving module 110 in the information-image-generating image processing apparatus 330 receives the document/page/input object information table 800. FIG. 8 is an explanatory diagram illustrating an example data structure of the document/page/input object information table 800. The document/page/input object information table 800 includes a document ID column 810, a page ID column 820, and an input object information column 830. The document ID column 810 stores document IDs, which serve as information for uniquely identifying documents in the system illustrated in FIG. 3. The page ID column 820 stores page IDs, which serve as information for uniquely identifying pages in the respective documents. The input object information column 830 stores first input object information or second input object information corresponding to the respective pages.

Alternatively, the input object information specifying module 314 may supply a document/input object information table 900 (see FIG. 9) to the information-image-generating image processing apparatus 330, instead of the input field/input object information table 700. In this case, an entire document (if there are plural pages, all the plural pages) serves as an object region or an input field, and first input object information or second input object information is specified for the entire document. Accordingly, the input object information receiving module 110 in the information-image-generating image processing apparatus 330 receives the document/input object information table 900. FIG. 9 is an explanatory diagram illustrating an example data structure of the document/input object information table 900. The document/input object information table 900 includes a document ID column 910 and an input object information column 920. The document ID column 910 stores document IDs, which serve as information for uniquely identifying documents in the system illustrated in FIG. 3. The input object information column 920 stores first input object information or second input object information corresponding to the respective documents.

At the time of printing a document, the document creating application 312 specifies the name of the apparatus that performs printing (the name of a printer, i.e., the name of the information-image-generating image processing apparatus 330), generates a document image, supplies the document ID and the first input object information or second input object information specified by the input object information specifying module 314 to the information-image-generating image processing apparatus 330, and provides an print instruction. In an information image printed accordingly, the first input object information or second input object information is embedded in each object region or input field. Then, the document creating application 312 causes the document DB 320 to store the created electronic document. Also, the document creating application 312 supplies information about the layout of the object regions or input fields of the target document (for example, a document layout table 1000 illustrated in FIG. 10) to the information-image-generating image processing apparatus 330. Accordingly, the document layout receiving module 120 in the information-image-generating image processing apparatus 330 receives the information about the layout. FIG. 10 is an explanatory diagram illustrating an example data structure of the document layout table 1000. The document layout table 1000 includes an input field ID column 1010, a position column 1020, a height column 1030, and a width column 1040. The input field ID column 1010 stores object region IDs or input field IDs. The position column 1020 stores the upper-left-corner positions of the respective object regions or input fields, for example. The height column 1030 stores the heights of the respective object regions or input fields. The width column 1040 stores the widths of the respective object regions or input fields.

The document DB 320 is connected to the document-creating information processing apparatus 310 and the write-back information processing apparatus 360. The document DB 320 stores an electronic document created by the document creating application 312. The write-back module 364 combines writing information related to the digital pen 350 with the stored electronic document.

The information-image-generating image processing apparatus 330 is connected to the document-creating information processing apparatus 310, corresponds to the image processing apparatus (image output apparatus) illustrated in FIG. 1, prints an electronic document created by the document-creating information processing apparatus 310, and outputs the document-with-information-image 340 obtained by combining an information image. The document-with-information-image 340 is a paper document that is generated by printing an electronic document, and is a paper document on which position information is superimposed as an information image. Also, a document ID and so forth may be embedded in the information image.

Now, an example of an electronic document 400 and a document-with-information-image 450 will be described with reference to FIGS. 4A and 4B.

Figure 4A:
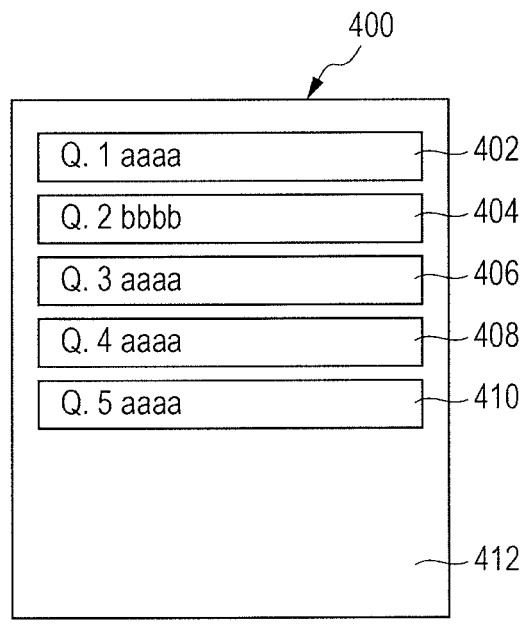
FIGS. 4A and 4B are explanatory diagrams illustrating an example of an electronic document and a document-with-information-image.

The electronic document 400 illustrated in FIG. 4A is a document created by the document creating application 312 and is stored in the document DB 320. For example, assume that the electronic document 400 has questions described therein as content and has five question regions serving as object regions, and that first input object information, which is information about a question region, is specified in each of the question regions.

Figure 4B:
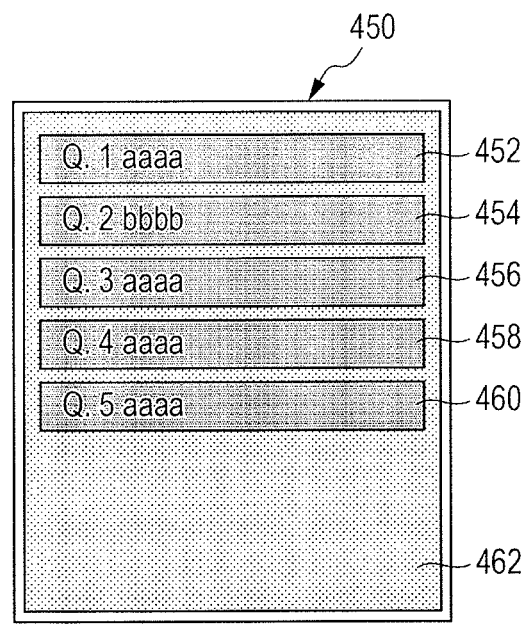

The document-with-information-image 450 illustrated in FIG. 4B is a paper document obtained through printing performed by the information-image-generating image processing apparatus 330, and reading is performed thereon by a user who operates the digital pen 350. An information image embedded with first input object information is combined into each of a question region 452, a question region 454, a question region 456, a question region 458, and a question region 460 of the document-with-information-image 450. Additionally, position information, a document ID, and so forth may be embedded in the information image. Also, an information image embedded with "ANY" is combined with a background 462. Alternatively, no information image may be combined with the background 462.

Next, an example of an electronic document 500 and a document-with-information-image 550 will be described with reference to FIGS. 5A and 5B.

Figure 5A:
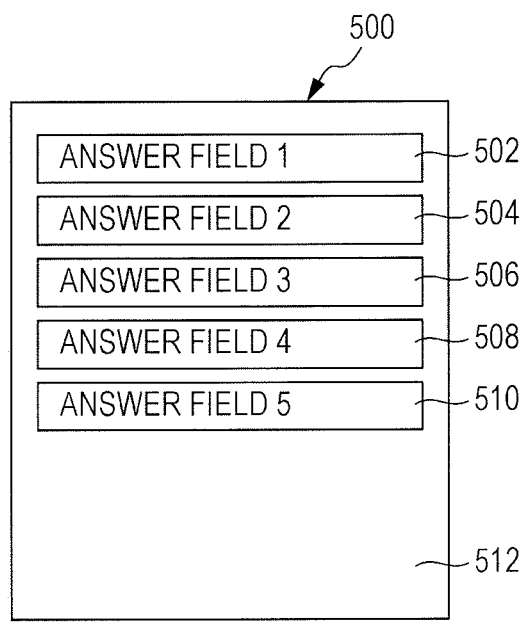
FIGS. 5A and 5B are explanatory diagrams illustrating an example of an electronic document and a document-with-information-image.

The electronic document 500 illustrated in FIG. 5A is a document in which answers to the questions described in the electronic document 400 illustrated in FIG. 4A are to be described. The electronic document 500 is created by the document creating application 312 and is stored in the document DB 320. For example, the electronic document 500 has five answer regions serving as input regions. An answer field region 502 corresponds to the question region 402, an answer field region 504 corresponds to the question region 404, an answer field region 506 corresponds to the question region 406, an answer field region 508 corresponds to the question region 408, and an answer field region 510 corresponds to the question region 410. These regions are input regions in which answers to the respective questions are to be described. Assume that second input object information is specified to the individual input regions.

Figure 5B:
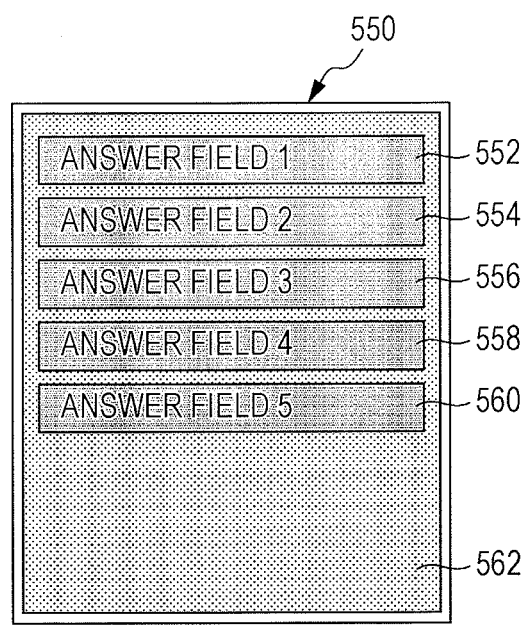

The document-with-information-image 550 illustrated in FIG. 5B is a paper document in which answers to the questions described in the document-with-information-image 450 illustrated in FIG. 4B are to be described. The document-with-information-image 550 is obtained through printing performed by the information-image-generating image processing apparatus 330, and writing is performed thereon through an operation of the digital pen 350 by a user. An information image embedded with position information and second input object information (of course, second input object information corresponding to the first input object information embedded in the information image combined with the corresponding field in the document-with-information-image 450) is combined into each of an answer field region 552, an answer field region 554, an answer field region 556, an answer field region 558, and an answer field region 560 in the document-with-information-image 550. Also, a document ID and so forth may be embedded in the information image. An information image embedded with at least position information is combined with a background 562. Alternatively, the information image combined with the background 562 may be embedded with "ANY", a document ID, etc. as well as position information. Alternatively, no information image may be combined with the background 562.

Next, an example of a document-with-information-image (sticker) 600 and a document-with-information-image (maintenance log) 650 will be described with reference to FIGS. 6A and 6B.

Figure 6A:
FIGS. 6A and 6B are explanatory diagrams illustrating an example of a document-with-information-image.

The document-with-information-image (sticker) 600 illustrated in FIG. 6A is a paper document that is to be attached to a device to be managed, is created by the document creating application 312, and is obtained through printing performed by the information-image-generating image processing apparatus 330. The document-with-information-image (sticker) 600 is read through an operation of the digital pen 350 performed by a user.

An information image embedded with first input object information is combined with the document-with-information-image (sticker) 600. Alternatively, a document ID and so forth may be embedded in the information image.

Figure 6B:
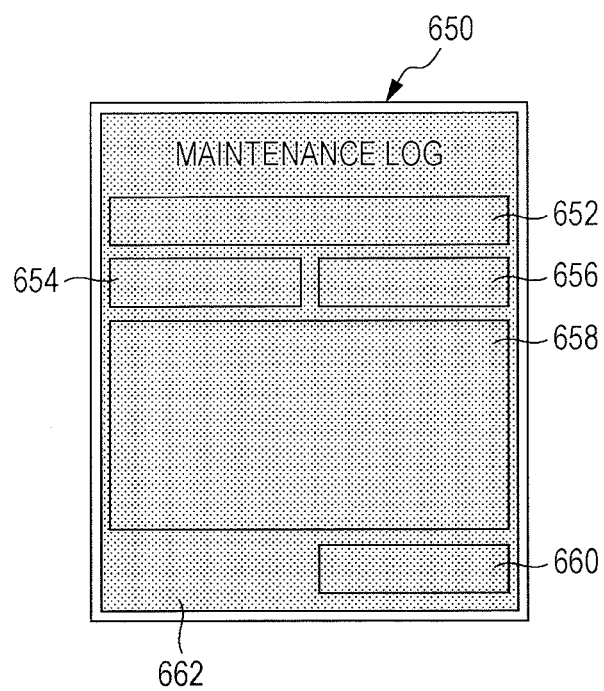

The document-with-information-image (maintenance log) 650 illustrated in FIG. 6B is a paper document in which a check result corresponding to the document-with-information-image (sticker) 600 illustrated in FIG. 6A is to be described, is created by the document creating application 312, and is obtained through printing performed by the information-image-generating image processing apparatus 330. The electronic document corresponding thereto is stored in the document DB 320. Writing is performed on the document-with-information-image (maintenance log) 650 through an operation of the digital pen 350 performed by a user.

An information image embedded with position information and second input object information (of course, second input object information corresponding to the first input object information embedded in the information image combined into the document-with-information-image (sticker) 600) is combined into each of an input field region 652, an input field region 654, an input field region 656, an input field region 658, and an input field region 660 in the document-with-information-image (maintenance log) 650. The pieces of second input object information embedded in the respective information images combined into the input field regions 652 to 660 may have the same value. Alternatively, the pieces of second input object information embedded in the respective information images combined into the input field regions 652 to 660 may have values different from one another if the pieces of second input object information correspond to the first input object information embedded in the information image combined with the document-with-information-image (sticker) 600. An information image embedded with at least position information is combined with a background 662. Alternatively, the information image combined with the background 662 may be embedded with "ANY", a document ID, etc. as well as position information. Alternatively, no information image may be combined with the background 662.

Figure 11A:
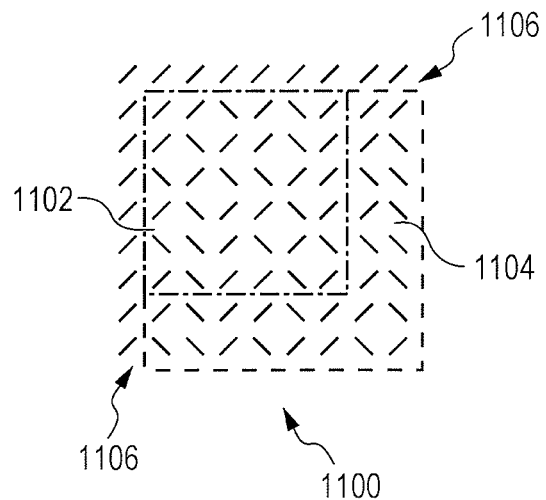
FIGS. 11A to 11C are explanatory diagrams illustrating an example of an information image.
Figure 11B:
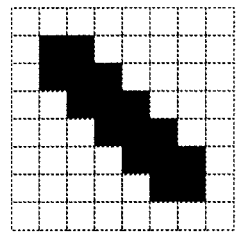
Figure 11C:
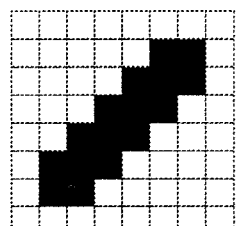

FIGS. 11A to 11C are explanatory diagrams illustrating an example of an information image.

This example is a two-dimensional code pattern image in which glyph code is used as a code symbol serving as an information image (for example, Japanese Unexamined Patent Application Publication Nos. 6-103390 and 6-75795). The glyph code represents data using sloping lines of different angles, and has been developed by Palo Alto Research Center of Xerox Corporation in the United States.

In this example, a unit region 1100 is a square region formed of eight symbols×eight symbols. The values of individual symbols are expressed by sloping line patterns, as illustrated in FIGS. 11B and 11C. In this example, a symbol value of zero is expressed by a downward sloping line that forms an angle of 45 degrees counterclockwise with respect to a vertical line (pattern 0 in FIG. 11B). A symbol value of one is expressed by an upward sloping line that forms an angle of 45 degrees clockwise with respect to the vertical line (pattern 1 in FIG. 11C).

A position code image 1102 is a square image formed of six symbols×six symbols at the upper left corner of the unit region 1100. An identification code image 1104 is a reverse-L-shaped region, which is a region obtained by subtracting the position code image 1102 from the unit region 1100.

In this example, a column and a row of a synchronization code 1106 are provided in vertical and horizontal directions along the periphery of the unit region 1100. In this example, the synchronization code 1106 is a sequence of upward sloping line symbols ("1"). The size and alignment pitch of the symbols are the same as those in the unit region 1100. The synchronization code 1106 is provided in the vertical and horizontal directions at regular intervals, and each unit region 1100 is provided in the square region surrounded by the synchronization code 1106. The synchronization code 1106 serves as a partition of unit regions 1100. That is, in an apparatus that has read a two-dimensional code pattern image, if rows and columns of sequential upward sloping line symbols are detected, inner regions of a grid pattern formed of the rows and columns may be recognized as unit regions 1100. Also, the six×six symbols at the upper-left corner of each of the unit regions 1100 may be recognized as the position code image 1102.

The synchronization code 1106 is not necessarily be that illustrated in FIG. 11A as long as it specifies the position of the unit region 1100 or the position code image 1102. For example, a symbol in a specific shape different from the sloping line symbol may be placed at the four corners of the unit region 1100, thereby forming the synchronization code 1106. In the example illustrated in FIG. 11A, a row and a column having a width corresponding to one symbol are used for the synchronization code 1106. However, if marks forming the synchronization code 1106 are sufficiently small, unit regions 1100 may be two-dimensionally arranged without gaps therebetween, and the marks may be arranged in the margin of the unit regions 1100 adjacent to each other.

In the example illustrated in FIG. 11A, 36 symbols in total, that is, data of 36 bits, is stored in one position code image 1102. Among the 36 bits, 18 bits may be used for encoding an x coordinate, and the other 18 bits may be used for encoding a y coordinate. If each group of 18 bits is used for encoding positions, $2^{18}$ types of (about 260,000 types of) positions may be encoded. Assume that each sloping line pattern is constituted by eight pixels×eight pixels, as illustrated in FIGS. 11B and 11C, and that printing is performed at 600 dpi. In this case, the length of one dot is 0.0423 mm in the vertical and horizontal directions, and thus the length of the two-dimensional code illustrated in FIG. 11A (including the synchronization code 1106) is about 3 mm (=eight pixels per symbol×nine symbols×0.0423 mm) in both the vertical and horizontal directions. If 260,000 types of positions are encoded at the intervals of 3 mm, a length of about 786 m may be encoded. If the reading accuracy is high, all the 18 bits may be used for encoding positions. However, if a reading error becomes a problem, it is appropriate to add redundant bits for error detection and error correction. The performance of error detection and error correction may be enhanced by increasing the ratio of redundant bits to 18 bits, but the range of positions that may be expressed decreases.

In the example illustrated in FIG. 11A, the identification code image 1104 is formed of a rectangular region of two bits×eight bits and a rectangular region of two bits×six bits, so that identification information or the like of 28 bits in total may be stored therein. If 28 bits are used for identification information or the like, about 270,000,000 types of ($2^{28}$ types of) identification information or the like may be expressed. Alternatively, some of the 28 bits may be used as redundant bits for error detection and error correction so as to handle a read error. In this exemplary embodiment, the identification information includes at least first input object information and second input object information, and may also include a document ID and a page ID. For example, the identification information may include a sheet identification number that uniquely identifies a sheet. The identification code images 1104 in the unit regions 1100 printed in input fields of one sheet are the same. Of course, the position code images 1102 in the individual unit regions 1100 are different from one another because the position information represented by the position code images 1102 in the unit regions 1100 is information representing positions in the sheet.

In the above-described example, two sloping line patterns having angles different from each other by 90 degrees are used as symbols, thereby expressing one-bit data by one symbol. This is merely an example. For example, if a pattern of a vertical line and a horizontal line is added to a symbol, two-bit information may be expressed by one symbol. In this way, the number of bits expressing one symbol may be increased by increasing the types of angle of a sloping line pattern of one symbol. Also, a code other than the glyph code may be used as an information image.

The digital pen 350 (also called a scanner-equipped pen or an electronic pen) reads an information image when the user performs writing on the document-with-information-image 340 using the digital pen 350, extracts a trail the writing as stroke information, and transmits the stroke information to the write-back information processing apparatus 360. Then, the digital pen 350 determines whether or not second input object information corresponds to first input object information, and outputs a warning if they do not correspond to each other. The configuration of the digital pen 350 and the processing performed thereby will be described below with reference to FIG. 12 and so forth. Here, the stroke information is information that is represented as a series of coordinates obtained by performing writing on the document-with-information-image 340 using the digital pen 350.

The write-back information processing apparatus 360 includes the stroke information extracting module 362 and the write-back module 364, and is connected to the document DB 320 and the digital pen 350.

The stroke information extracting module 362 has a function of obtaining, from the digital pen 350, stroke information about a stroke made on the document-with-information-image 340. The stroke information includes the document ID of the document-with-information-image 340 on which the stroke has been made, a page number, a stroke sequence (sequence of position information), etc.

The document ID is information for uniquely identifying a document in the system illustrated in FIG. 3, as described above. An electronic document and a paper document obtained by printing the electronic document have the same document ID. The document ID is necessary for identifying the paper document serving as a target of handwriting and for specifying the original electronic document corresponding thereto. However, the document ID is not necessary for determining whether or not second input object information corresponds to first input object information. Something other than the document ID may be used as long as the correspondence between an electronic document and a paper document is specified.

The write-back module 364 is an application program for writing back, to an original electronic document, stroke information about a stroke made on the document-with-information-image 340 using the digital pen 350. The write-back module 364 performs processing of reflecting the stroke information received from the stroke information extracting module 362 as stroke information on the electronic document on the basis of information about a document ID and page ID.

Figure 12:
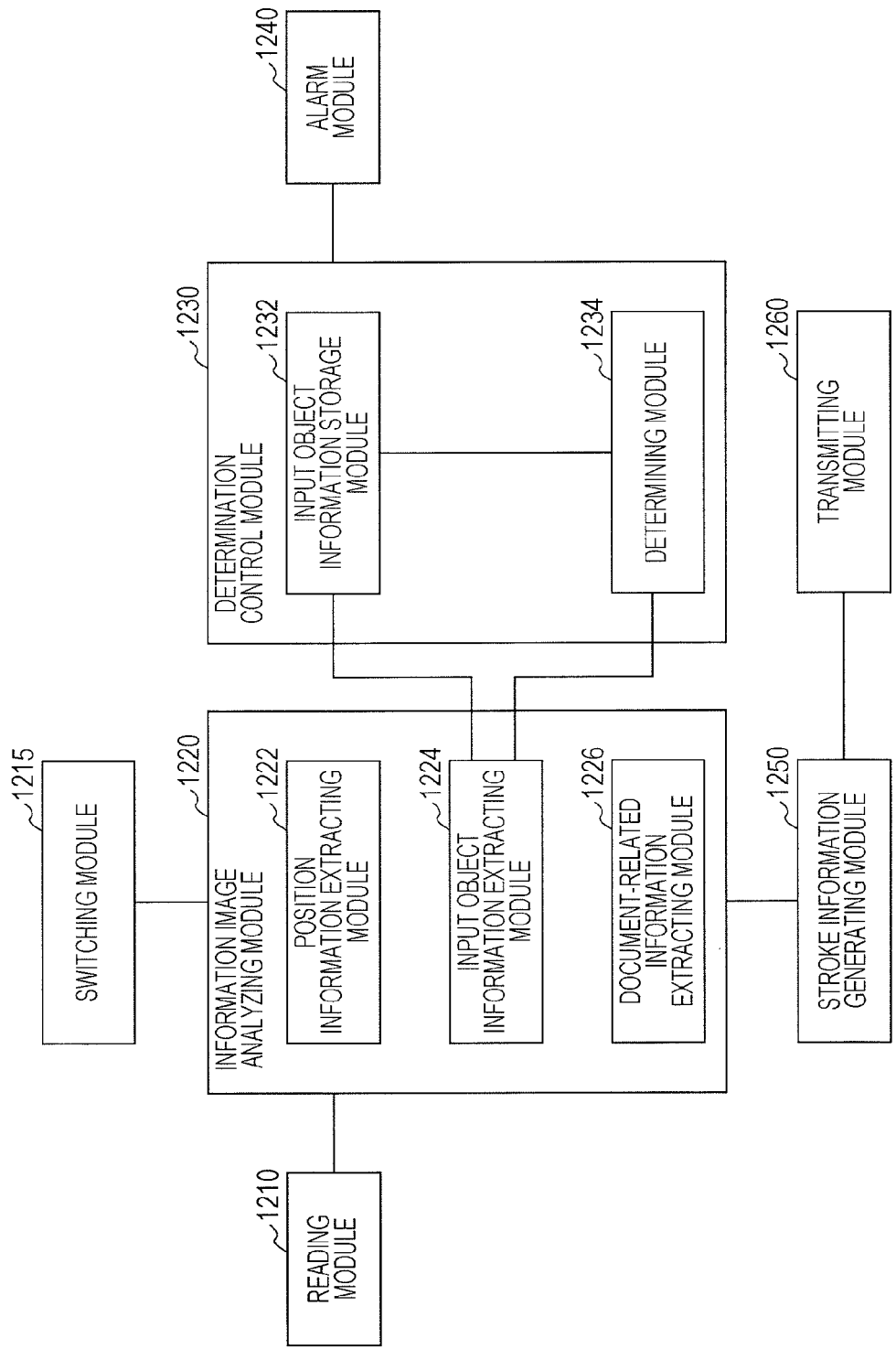
FIG. 12 is a conceptual module configuration diagram illustrating an example configuration of an image reading apparatus (1) according to the exemplary embodiment.

FIG. 12 is a conceptual module configuration diagram illustrating an example configuration of an image reading apparatus (1) according to the exemplary embodiment. The image processing apparatus (image reading apparatus (1)) according to the exemplary embodiment reads a document combined with an information image, and includes a reading module 1210, an information image analyzing module 1220, a switching module 1215, a determination control module 1230, an alarm module 1240, a stroke information generating module 1250, and a transmitting module 1260, as illustrated in FIG. 12. These modules are accommodated in the digital pen 350 illustrated in FIG. 3.

The reading module 1210 is connected to the information image analyzing module 1220. The reading module 1210 reads an information image that has been output onto a medium such as paper and that is used for extracting a writing position of a writing tool. Here, the medium such as paper is a document combined with an information image that is generated on the basis of first input object information (for example, the document-with-information-image 450 illustrated in FIG. 4B or the image-with-information-image (sticker) 600 illustrated in FIG. 6A) or a document combined with an information image that is generated on the basis of second input object information and position information representing a position in the document (for example, the document-with-information-image 550 illustrated in FIG. 5B or the document-with-information-image (maintenance log) 650 illustrated in FIG. 6B). In the above-described example, the reading module 1210 reads an image at a writing position on the document-with-information-image 340. The reading module 1210 corresponds to an image reading module 1452 illustrated in FIG. 14 (described below).

Additionally, the information image read by the reading module 1210 may further include document information representing a document.

The switching module 1215 is connected to the information image analyzing module 1220. In the image reading apparatus (1) according to the exemplary embodiment illustrated in FIG. 12, the reading module 1210 reads an information image embedded with first input object information and an information image embedded with second input object information using the same reader. Accordingly, the switching module 1215 performs control in accordance with an operation performed by an operator so that the reading module 1210 reads an information image as an information image embedded with first input object information or as an information image embedded with second input object information. For example, when a switching button 1454 illustrated in FIG. 14 (described below) is pressed, the switching module 1215 performs control so that the reading module 1210 reads an information image as an information image embedded with first input object information. When the switching button 1454 is not pressed, the switching module 1215 performs control so that the reading module 1210 reads an information image as an information image embedded with second input object information.

The information image analyzing module 1220 includes a position information extracting module 1222, an input object information extracting module 1224, and a document-related information extracting module 1226, and is connected to the reading module 1210, the switching module 1215, the determination control module 1230, and the stroke information generating module 1250.

The position information extracting module 1222 analyzes an information image read by the reading module 1210, thereby extracting position information. That is, the position information extracting module 1222 extracts position information representing a writing position, so that stroke information serving as writing information may be generated using the position information.

The input object information extracting module 1224 analyzes an information image read by the reading module 1210, thereby extracting first input object information or second input object information from the identification information or the like in the information image. That is, under control performed by the switching module 1215, the input object information extracting module 1224 analyzes the information image read by the reading module 1210 as an information image embedded with first input object information, thereby extracting the first input object information, and analyzes the information image read by the reading module 1210 as an information image embedded with second input object information, thereby extracting the second input object information. Then, the input object information extracting module 1224 supplies the extracted first input object information to an input object information storage module 1232 in the determination control module 1230, and also supplies the extracted second input object information to a determining module 1234 in the determination control module 1230.

The document-related information extracting module 1226 analyzes an information image read by the reading module 1210, thereby extracting information related to a document from the identification information or the like in the information image. Examples of the information related to a document include a document ID serving as document information.

The determination control module 1230 is connected to the information image analyzing module 1220 and the alarm module 1240, and includes the input object information storage module 1232 and the determining module 1234.

The input object information storage module 1232 is connected to the input object information extracting module 1224 and the determining module 1234. The input object information storage module 1232 stores first input object information extracted by the input object information extracting module 1224. Specifically, the input object information storage module 1232 stores an input object information table 1600. FIG. 16 is an explanatory diagram illustrating an example data structure of the input object information table 1600. The input object information table 1600 has an input object information A column 1610. The input object information A column 1610 stores first input object information.

The first input object information stored in the input object information storage module 1232 may be plural pieces of first input object information.

The determining module 1234 is connected to the input object information extracting module 1224 and the input object information storage module 1232. The determining module 1234 compares the first input object information stored in the input object information storage module 1232 with the second input object information extracted by the input object information extracting module 1224, thereby determining whether or not the second input object information corresponds to the first input object information. An example of this will be described using the document-with-information-image 450 illustrated in FIG. 4B and the document-with-information-image illustrated in FIG. 5B. If the reading module 1210 reads the question region 452 in the document-with-information-image 450 and then reads the answer field region 552 in the document-with-information-image 550, the determining module 1234 determines that the second input object information corresponds to the first input object information. That is, the determining module 1234 determines that the position where information is to be input or the position where information has been input (answer field region 552) corresponds to the position where information has been previously read (question region 452). If the reading module 1210 reads the question region 452 in the document-with-information-image 450 and then reads the answer field region 554 in the document-with-information-image 550, the determining module 1234 determines that the second input object information does not correspond to the first input object information. That is, the determining module 1234 determines that the position where information is to be input or the position where information has been input (answer field region 554) does not correspond to the position where information has been previously read (question region 452).

In order to determine such correspondence, it may be determined whether or not any of the above-described correspondence forms (B1) to (B5) may be applied.

For example, if the first input object information matches the second input object information as in the form (B1), the determining module 1234 determines that both the pieces of information correspond to each other. If the first input object information is different from the second input object information, the determining module 1234 determines that both the pieces of information do not correspond to each other.

In a case where the first input object information has a hierarchical structure as in the form (B2), if the second input object information is located in the lower layer of or in the same layer as the first input object information, the determining module 1234 determines that both the pieces of information correspond to each other. Otherwise, the determining module 1234 determines that both the pieces of information do not correspond to each other.

Figure 24:
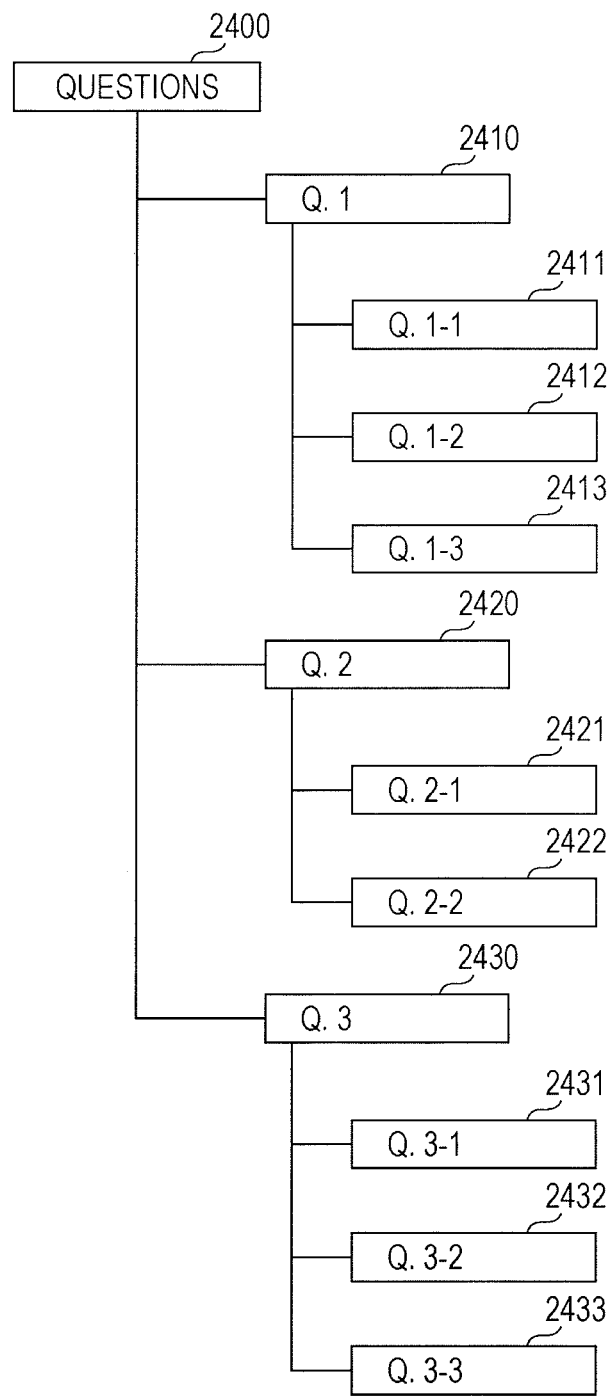
FIG. 24 is an explanatory diagram illustrating an example data structure of input object information.

FIG. 24 is an explanatory diagram illustrating an example data structure of input object information. In the example illustrated in FIG. 24, there are Q. 1 2410, Q. 2 2420, and Q. 3 2430 in the lower layer of questions 2400. In the lower layer of Q. 1 2410, there are Q. 1-1 2411, Q. 1-2 2412, and Q. 1-3 2413. In the lower layer of Q. 2 2420, there are Q. 2-1 2421 and Q. 2-2 2422. In the lower layer of Q. 3 2430, there are Q. 3-1 2431, Q. 3-2 2432, and Q. 3-3 2433. Such a hierarchical structure is stored in the input object information storage module 1232, thereby being used for determining whether or not the second input object information corresponds to the first input object information. For example, in a case where the first input object information stored in the input object information storage module 1232 is Q. 2 2420 and where the second input object information extracted by the input object information extracting module 1224 is Q. 2-1 2421, it is determined that the second input object information corresponds to the first input object information. In a case where the second input object information extracted by the input object information extracting module 1224 is Q. 1-3 2413, it is determined that the second input object information does not correspond to the first input object information. Also, information about a difference of layer in the hierarchical structure may be used as part of input object information, so that the difference may be used for determining whether or not the second input object information corresponds to the first input object information. The hierarchical structure illustrated in FIG. 24 has a three-layer structure in which the questions are located in the first layer, Q. 1 to Q. 3 are located in the second layer, and Q. 1-1 etc. under the respective Qs are located in the third layer. Here, the first layer may be represented by A, the second layer may be represented by B, and the third layer may be represented by C, and the connection among them may be used as input object information. In this case, the ID of the questions is "A", the ID of each of Q. 1 to Q. 3 is "A-B", and the ID of Q. 1-1 etc. is "A-B-C". By using such IDs representing information about the hierarchical structure, the upper-lower relationship in the hierarchical structure of input object information is clarified, so that it may be determined whether or not the second input object information corresponds to the first input object information. As the foregoing A, B, and C, the IDs of the respective Qs may be used.

The alarm module 1240 is connected to the determination control module 1230, and outputs a warning if the determining module 1234 determines that the second input object information does not correspond to the first input object information. The warning indicates that the position where reading has been performed by the reading module 1210 (the position of an information image embedded with the second input object information, the position where writing is to be performed, or the position where writing has been performed) does not correspond to the position where reading has been previously performed by the reading module 1210 (the position of an information image embedded with the first input object information). For example, the alarm module 1240 may include a speaker, a light source, a vibration device, or the like. The mode of warning to be output may be sound (warning sound, voice message, etc.), light (blinking of a light source, output of a predetermined color, etc.), vibration, or the like.

The determining module 1234 makes a determination and the alarm module 1240 outputs a warning regardless of whether or not writing is actually being performed. If the reading module 1210 reads an information image before writing is performed, a warning may be output before writing is performed. If the reading module 1210 reads an information image while writing is being performed, a warning may be output while writing is being performed.

A warning may be continuously output until a predetermined time has elapsed after start of the output, until the determining module 1234 determines that the second input object information corresponds to the first input object information at the position where reading has been performed by the reading module 1210, or until an operator performs an operation of forcibly stopping the warning.

Also, if the determining module 1234 determines that the second input object information does not correspond to the first input object information, the alarm module 1240 may perform control so that writing is not performed by the digital pen. For example, the alarm module 1240 may have a mechanism of accommodating the tip of the digital pen, and may perform control to accommodate the tip so that writing is not performed if it is determined that the second input object information does not correspond to the first input object information. In a case where an inkjet scheme is employed as the writing mechanism of the digital pen and where it is determined that the second input object information does not correspond to the first input object information, the alarm module 1240 may perform control to stop ejection of ink so that writing is not performed.

Also, if the determining module 1234 determines that the second input object information does not correspond to the first input object information, the alarm module 1240 may perform control so that the position information extracted by the position information extracting module 1222 is not output to the transmitting module 1260. For example, in order to perform control so as not to output position information to the transmitting module 1260, the alarm module 1240 may cause the position information extracting module 1222 not to extract position information, may cause the position information extracted by the position information extracting module 1222 not to be stored, may cause the stroke information generating module 1250 not to generate stroke information, or may cause the transmitting module 1260 not to perform transmission.

Also, the alarm module 1240 may combine any two or more of warning, control to prevent writing using the digital pen, and control to prevent output of position information.

The stroke information generating module 1250 is connected to the information image analyzing module 1220 and the transmitting module 1260. The stroke information generating module 1250 generates stroke information on the basis of the position information extracted by the position information extracting module 1222 and the document-related information extracted by the document-related information extracting module 1226. For example, the stroke information generating module 1250 may generate a stroke information table 1500. FIG. 15 is an explanatory diagram illustrating an example data structure of the stroke information table 1500. The stroke information table 1500 includes a document ID column 1510, an X coordinate column 1520, and a Y coordinate column 1530. The document ID column 1510 stores document IDs, which serve as document-related information extracted by the document-related information extracting module 1226. The X coordinate column 1520 and the Y coordinate column 1530 store X coordinates and Y coordinates, which serve as position information extracted by the position information extracting module 1222.

The transmitting module 1260 is connected to the stroke information generating module 1250. The transmitting module 1260 transmits the stroke information generated by the stroke information generating module 1250 to the foregoing write-back information processing apparatus 360. Alternatively, the generated stroke information may be accumulated in a stroke information storage module (not illustrated). Then, when the image reading apparatus (digital pen 350) is connected to the write-back information processing apparatus 360, the transmitting module 1260 may transmit the stroke information accumulated in the stroke information storage module to the write-back information processing apparatus 360.

Figure 13:
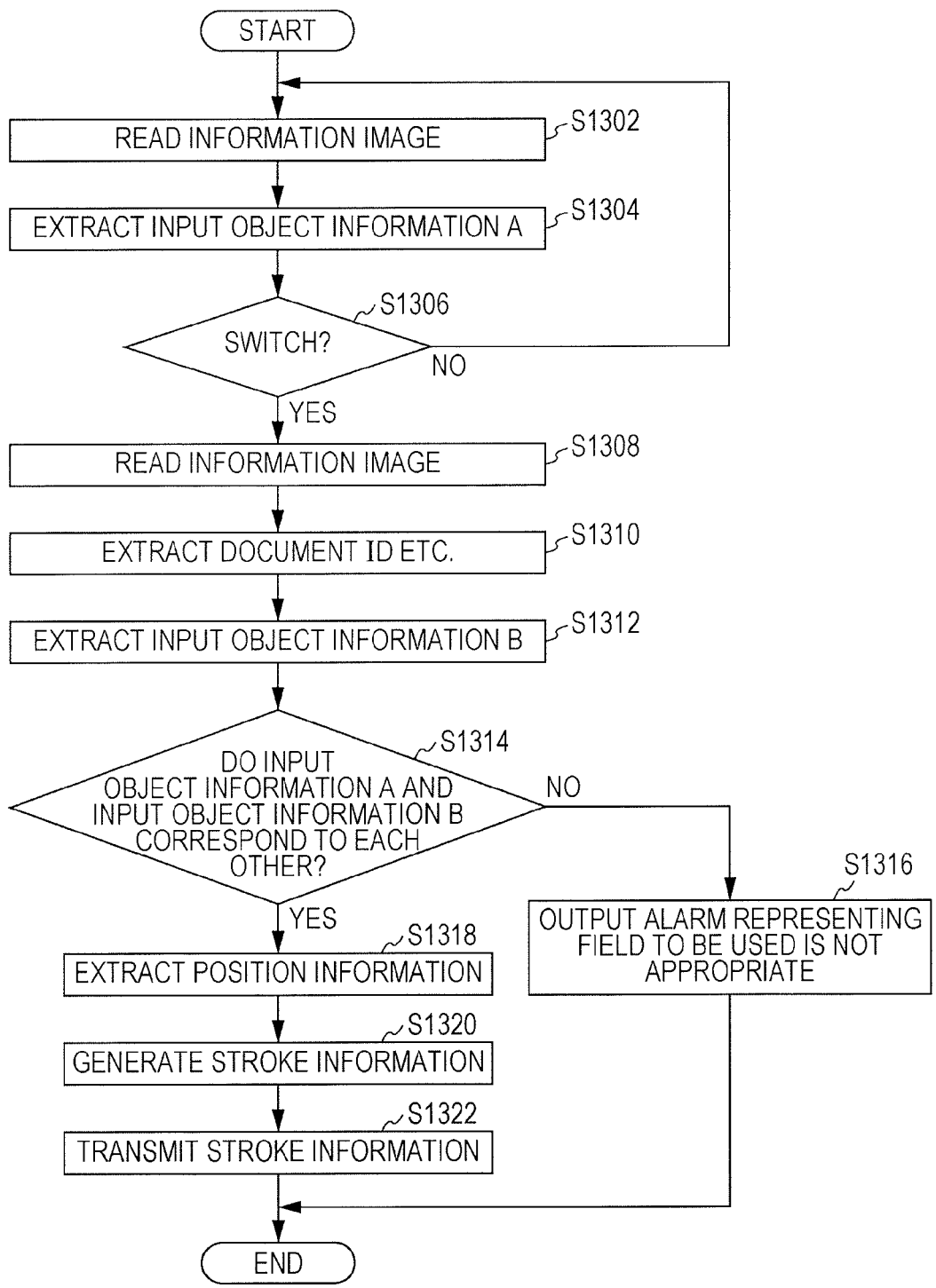
FIG. 13 is a flowchart illustrating a first example of processing performed by the image reading apparatus (1) according to the exemplary embodiment.

FIG. 13 is a flowchart illustrating a first example of processing performed by the image reading apparatus (1) according to the exemplary embodiment.

In step S1302, the reading module 1210 reads an information image, for example, the information image combined with the question region 452 or the like in the document-with-information-image 450 illustrated in FIG. 4B.

In step S1304, the input object information extracting module 1224 extracts input object information A (first input object information).

In step S1306, the information image analyzing module 1220 determines whether or not switching by the switching module 1215 has been detected. If switching has been detected, the process proceeds to step S1308. Otherwise, the process returns to step S1302.

In step S1308, the reading module 1210 reads an information image, for example, the information image combined with the answer field region 552 or the like in the document-with-information-image 550 illustrated in FIG. 5B.

In step S1310, the document-related information extracting module 1226 extracts a document ID, etc.

In step S1312, the input object information extracting module 1224 extracts input object information B (second input object information).

In step S1314, the determining module 1234 determines whether or not the input object information A corresponds to the input object information B. If both the pieces of information correspond to each other, the process proceeds to step S1318. Otherwise, the process proceeds to step S1316.

In step S1316, the alarm module 1240 outputs an alarm representing that the field to which the user is going to input information is not an appropriate field.

In step S1318, the position information extracting module 1222 extracts position information.

In step S1320, the stroke information generating module 1250 generates stroke information.

In step S1322, the transmitting module 1260 transmits the stroke information.

FIG. 14 is an explanatory diagram illustrating a first example structure of the digital pen 350. The digital pen 350 includes an ink unit 1451, the image reading module 1452, a control/transmission module 1453, and the switching button 1454. The reading module 1210 illustrated in FIG. 12 is realized by the image reading module 1452. The information image analyzing module 1220, the determination control module 1230, the alarm module 1240, the stroke information generating module 1250, and the transmitting module 1260 are realized by the control/transmission module 1453. The switching module 1215 is realized by the switching button 1454 and the control/transmission module 1453.

In accordance with an operation performed by the operator of the digital pen 350, characters or the like are written on the document-with-information-image 340 using the ink unit 1451. Then, the image reading module 1452 performs continuous image capturing at a relatively high speed of about several tens to hundred and several tens of frames per second, scans individual frames, and outputs a read image to the control/transmission module 1453. The control/transmission module 1453 detects the synchronization code 1106 from the image read by the image reading module 1452. In the case of an image having the code pattern illustrated in FIGS. 11A to 11C, rows and columns of sequential upward sloping line patterns are detected as rows and columns of the synchronization code 1106. As the synchronization code, various types of codes that have been suggested may be used as well as the code illustrated in FIG. 11A, and the synchronization code may be detected using a certain method in accordance with the type of the synchronization code.

When the switching button 1454 is pressed through an operation performed by an operator, processing is performed under the assumption that the information image read by the image reading module 1452 is embedded with first input object information. When the switching button 1454 is not pressed, processing is performed under the assumption that the information image read by the image reading module 1452 is embedded with second input object information.

The position code image 1102 and the identification code image 1104 are extracted from the read image. The control/transmission module 1453 performs code recognition processing on the position code image 1102 and the identification code image 1104, thereby reproducing position information and identification information (including first input object information and second input object information). The code recognition processing performed here is, in brief, the reverse processing of information image generation processing. As for the identification code image 1104, the control/transmission module 1453 first recognizes individual sloping line symbols in the identification code image 1104, thereby obtaining the values of the respective symbols, and obtains an identification code matrix in which the values of the respective symbols are arranged in accordance with the arrangement positions of the respective symbols in the identification code image 1104. Then, the control/transmission module 1453 obtains a serial identification code for the identification code matrix, and performs decoding processing on the identification code in accordance with the encoding method, thereby decoding the identification information. As for the position code image 1102, position information may be decoded by performing processing equivalent to the foregoing processing. That is, the foregoing extraction and recognition processing is performed in units of frames, so that position information and identification information are obtained.

The position information and identification information obtained from the read image of each frame in this way are provided to the write-back information processing apparatus 360 that uses these pieces of information and are used therein. For example, in the case of the write-back information processing apparatus 360 that captures, as electronic information, the trail of a stroke made by an operator on a sheet having an information image printed thereon using the digital pen 350, the write-back information processing apparatus 360 specifies the sheet on the basis of the identification information to obtain the original document of the sheet, obtains the trail of a stroke made by the operator from the position information obtained from the individual frames that are sequentially read, and superimposes the image representing the trail on the original document to record the image.

Figure 17:
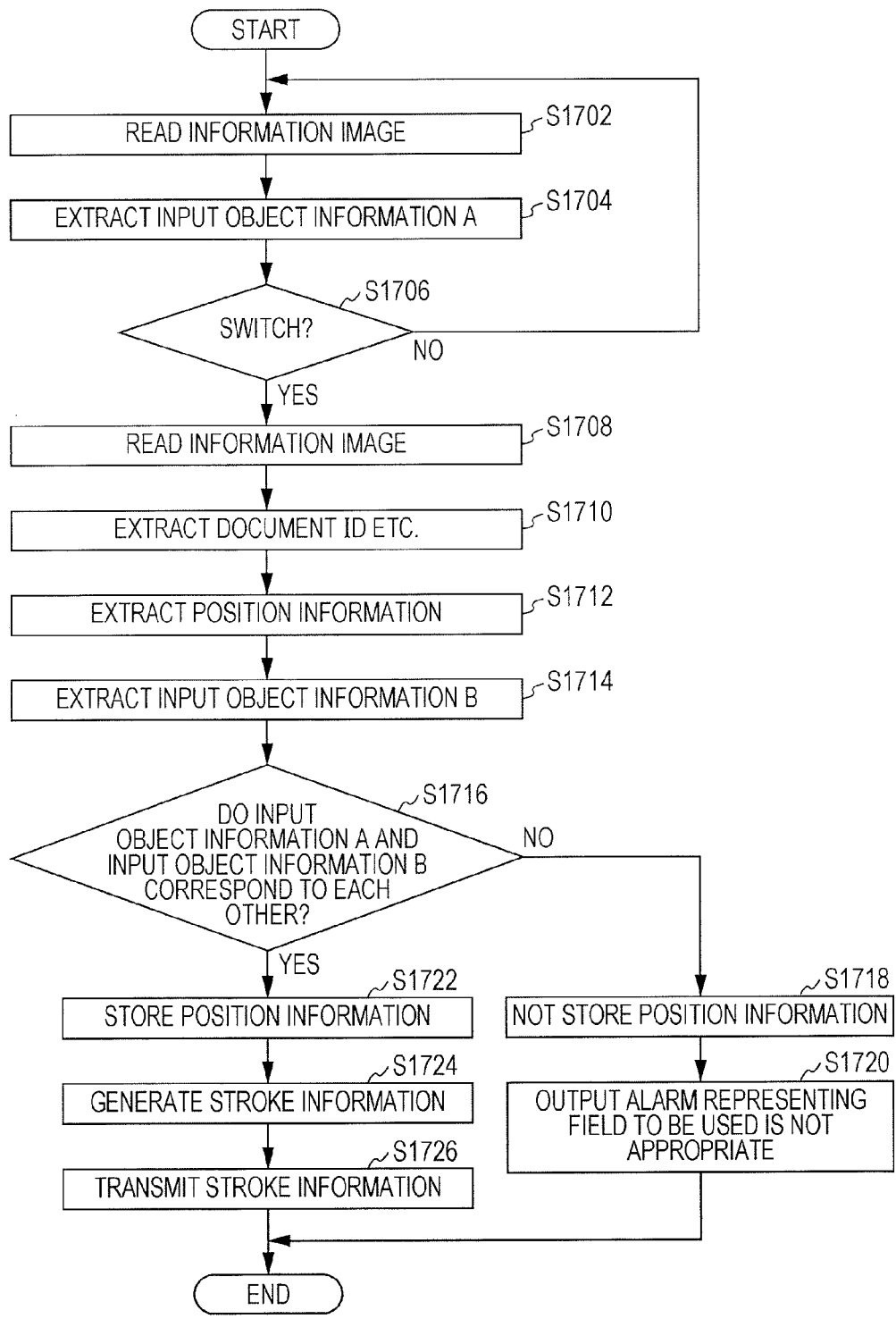
FIG. 17 is a flowchart illustrating a second example of processing performed by the image reading apparatus (1) according to the exemplary embodiment.

FIG. 17 is a flowchart illustrating a second example of processing performed by the image reading apparatus (1) according to the exemplary embodiment. In this example, the alarm module 1240 performs control to prevent position information from being stored and outputs a warning.

In step S1702, the reading module 1210 reads an information image.

In step S1704, the input object information extracting module 1224 extracts input object information A (first input object information).

In step S1706, the information image analyzing module 1220 determines whether or not switching by the switching module 1215 has been detected. If switching has been detected, the process proceeds to step S1708. Otherwise, the process returns to step S1702.

In step S1708, the reading module 1210 reads an information image.

In step S1710, the document-related information extracting module 1226 extracts a document ID, etc.

In step S1712, the position information extracting module 1222 extract position information.

In step S1714, the input object information extracting module 1224 extracts input object information B (second input object information).

In step S1716, the determining module 1234 determines whether or not the input object information A corresponds to the input object information B. If both the pieces of information correspond to each other, the process proceeds to step S1722. Otherwise, the process proceeds to step S1718.

In step S1718, the alarm module 1240 prevents the position information from being stored.

In step S1720, the alarm module 1240 outputs an alarm representing that the field to which the user is going to input information is not an appropriate field.

In step S1722, the position information extracting module 1222 stores the position information.

In step S1724, the stroke information generating module 1250 generates stroke information.

In step S1726, the transmitting module 1260 transmits the stroke information.

Figure 18:
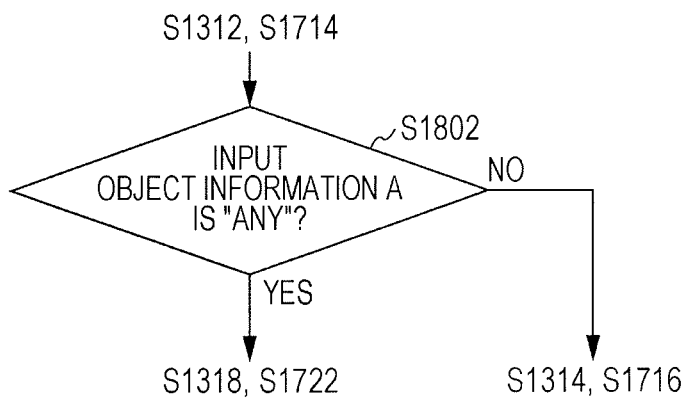
FIG. 18 is a flowchart illustrating a third example of processing performed by the image reading apparatus (1) according to the exemplary embodiment.

FIG. 18 is a flowchart illustrating a third example of processing performed by the image reading apparatus (1) according to the exemplary embodiment. In this example, "ANY" is embedded as first input object information in an information image in a background region. When the first input object information is "ANY", position information is read without determining whether or not the second input object information corresponds to the first input object information.

The processing illustrated in FIG. 18 is performed after step S1312 in the flowchart illustrated in FIG. 13 or after step S1714 in the flowchart illustrated in FIG. 17.

In step S1802, the determining module 1234 determines whether or not the input object information A (first input object information is "ANY". If the input object information A is "ANY", the process proceeds to step S1318 in FIG. 13 or step S1722 in FIG. 17. Otherwise, the process proceeds to step S1314 in FIG. 13 or step S1716 in FIG. 17.

Figure 19:
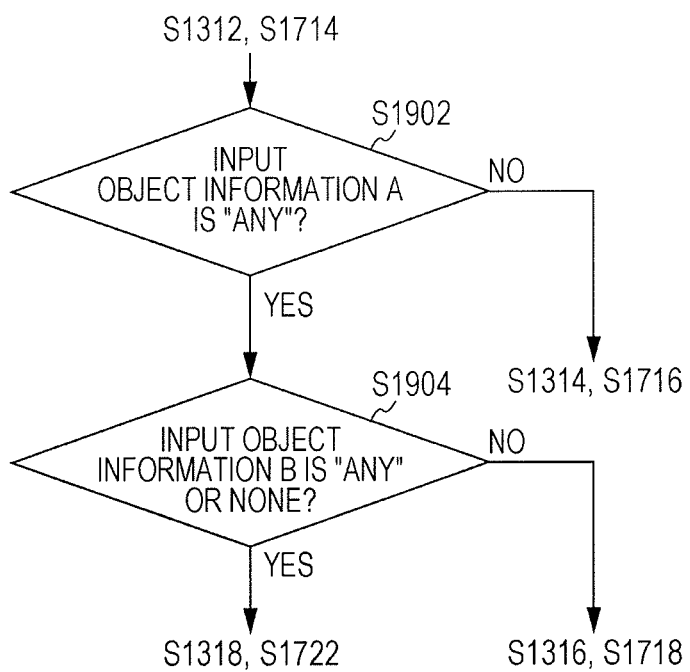
FIG. 19 is a flowchart illustrating a fourth example of processing performed by the image reading apparatus (1) according to the exemplary embodiment.

FIG. 19 is a flowchart illustrating a fourth example of processing performed by the image reading apparatus (1) according to the exemplary embodiment. In this example, "ANY" is embedded as first input object information in an information image in a background region. When the first input object information is "ANY" and when the second input object information is "ANY" or none, position information is read without determining whether or not the second input object information corresponds to the first input object information. When both of the first input object information and the second input object information are "ANY", it is determined that both of them correspond to each other. Also, when there is no second input object information (including when there is no information image), it is determined that both of them correspond to each other.

The processing illustrated in FIG. 19 is performed after step S1312 in the flowchart illustrated in FIG. 13 or after step S1714 in the flowchart illustrated in FIG. 17.

In step S1902, the determining module 1234 determines whether or not the input object information A (first input object information) is "ANY". If the input object information A is "ANY", the process proceeds to step S1904. Otherwise, the process proceeds to step S1314 in FIG. 13 or step S1716 in FIG. 17.

In step S1904, the determining module 1234 determines whether or not the input object information B (second input object information) is "ANY" or none. If the input object information B is "ANY" or none, the process proceeds to step S1318 in FIG. 13 or step S1722 in FIG. 17. Otherwise, the process proceeds to step S1316 in FIG. 13 or step S1718 in FIG. 17.

In the image reading apparatus (1) according to the exemplary embodiment, the reading module 1210 (image reading module 1452) reads both of an information image embedded with first input object information and an information image embedded with second input object information. Thus, a user may be notified which information image is to be currently read by the digital pen 350. For example, the alarm module 1240 may present, using sound, light, vibration, or the like, a state where an information image embedded with first input object information is to be read or a state where an information image embedded with second input object information is to be read.

The image reading apparatus (1) according to the exemplary embodiment is based on the assumption that the reading module 1210 (image reading module 1452) reads both of an information image embedded with first input object information and an information image embedded with second input object information. Alternatively, both of a mode of performing control on the basis of input object information and a mode of performing reading without control on the basis of input object information (normal reading mode) may be available. Also, the mode of the alarm module 1240 may be expressed by sound, light (for example, red light from a light-emitting diode (LED) in the former mode, and green light in the latter mode), vibration, or the like. The switching between the two modes may be realized by providing a set button similar to the switching button 1454 on the digital pen 350. In a case where an information image embedded with predetermined information is read, switching to the former mode or the latter mode may be performed.

Figure 20:
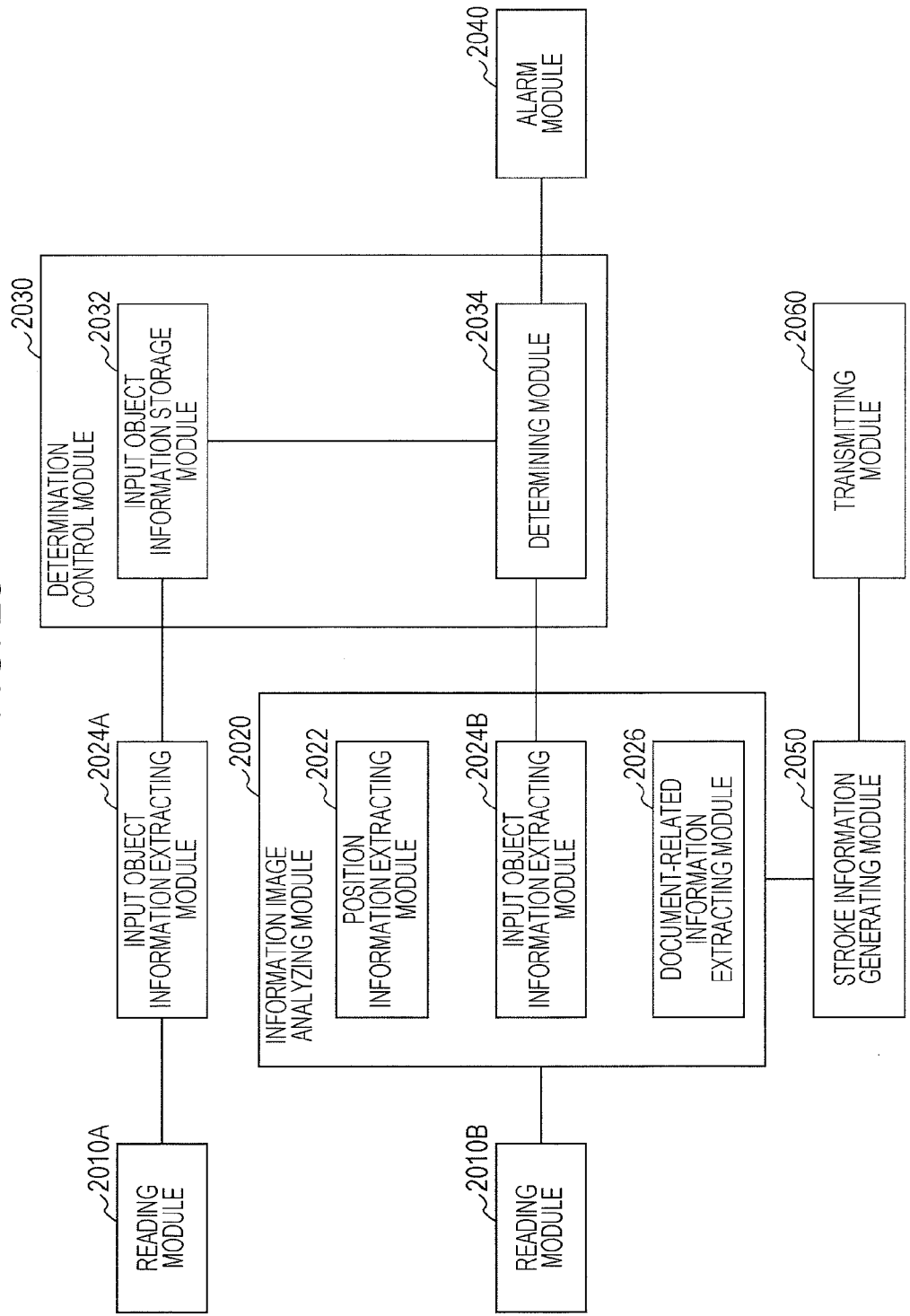
FIG. 20 is a conceptual module configuration diagram illustrating an example configuration of an image reading apparatus (2) according to the exemplary embodiment.

FIG. 20 is a conceptual module configuration diagram illustrating an example configuration of an image reading apparatus (2) according to the exemplary embodiment. Different from the image reading apparatus (1) illustrated in FIG. 12, the image reading apparatus (2) has two reading modules that read an information image, so that the necessity for the switching module 1215 is eliminated. One of the reading modules reads an information image embedded with first input object information, and the other reads an information image embedded with second input object information.

The image processing apparatus (image reading apparatus (2)) according to the exemplary embodiment reads a document combined with an information image, and includes a reading module 2010A, a reading module 2010B, an information image analyzing module 2020, an input object information extracting module 2024A, a determination control module 2030, an alarm module 2040, a stroke information generating module 2050, and a transmitting module 2060, as illustrated in FIG. 20. These modules are accommodated in the digital pen 350 and the reader 2300 illustrated in FIG. 23 (described below).

The reading module 2010A is connected to the input object information extracting module 2024A. The reading module 2010A reads an information image output onto a medium such as paper. Here, the medium such as paper is a document combined with an information image generated on the basis of first input object information (for example, the document-with-information-image 450 illustrated in FIG. 4B or the document-with-information-image (sticker) 600 illustrated in FIG. 6A). The reading module 2010A corresponds to the image reading module 2310 illustrated in FIG. 23 (described below).

An information image read by the reading module 2010A may further include document information representing a document.

The input object information extracting module 2024A is connected to the reading module 2010A and an input object information storage module 2032. The input object information extracting module 2024A analyzes an information image read by the reading module 2010A, thereby extracting first input object information from identification information or the like in the information image. Then, the input object information extracting module 2024A supplies the extracted first input object information to the input object information storage module 2032 of the determination control module 2030.

The reading module 2010B is connected to the information image analyzing module 2020. The reading module 2010B reads an information image that has been output onto a medium such as paper and that is used for extracting a writing position of a writing tool. Here, the medium such as paper is a document combined with an information image generated on the basis of second input object information and position information representing a position in the document (for example, the document-with-information-image 550 illustrated in FIG. 5B or the document-with-information-image (maintenance log) 650 illustrated in FIG. 6B). In the foregoing example, an image at a writing position in the document-with-information-image 340 is read. The reading module 2010B corresponds to the image reading module 1452 illustrated in FIG. 23 (described below).

An information image read by the reading module 2010B may further include document information representing a document.

The information image analyzing module 2020 is connected to the reading module 2010B, the determination control module 2030, and the stroke information generating module 2050, and includes a position information extracting module 2022, an input object information extracting module 2024B, and a document-related information extracting module 2026.

The position information extracting module 2022 analyzes an information image read by the reading module 2010B, thereby extracting position information. That is, the position information extracting module 2022 extracts position information about a position where information is written, so that stroke information as writing information may be generated using the position information.

The input object information extracting module 2024B is connected to a determining module 2034. The input object information extracting module 2024B analyzes an information image read by the reading module 2010B, thereby extracting second input object information from identification information or the like in the information image. Then, the input object information extracting module 2024B supplies the extracted second input object information to the determining module 2034 of the determination control module 2030.

The document-related information extracting module 2026 analyzes an information image read by the reading module 2010B, thereby extracting information related to the document from identification information or the like in the information image. The information related to the document may be, for example, a document ID serving as document information.

The determination control module 2030 includes the input object information storage module 2032 and the determining module 2034.

The input object information storage module 2032 is connected to the input object information extracting module 2024A and the determining module 2034. The input object information storage module 2032 stores first input object information extracted by the input object information extracting module 2024A. Specifically, the input object information storage module 2032 stores the input object information table 1600, for example.

Also, the first input object information stored in the input object information storage module 2032 may be plural pieces of first input object information.

The determining module 2034 is connected to the input object information extracting module 2024B, the input object information storage module 2032, and the alarm module 2040. The determining module 2034 compares the first input object information stored in the input object information storage module 2032 with the second input object information extracted by the input object information extracting module 2024B, thereby determining whether or not the second input object information corresponds to the first input object information. The determining module 2034 performs processing equivalent to the processing performed by the determining module 1234 illustrated in FIG. 12.

The alarm module 2040 is connected to the determining module 2034. The alarm module 2040 performs processing equivalent to the processing performed by the alarm module 1240 illustrated in FIG. 12.

The stroke information generating module 2050 is connected to the information image analyzing module 2020 and the transmitting module 2060. The stroke information generating module 2050 performs processing equivalent to the processing performed by the stroke information generating module 1250 illustrated in FIG. 12.

The transmitting module 2060 is connected to the stroke information generating module 2050. The transmitting module 2060 performs processing equivalent to the processing performed by the transmitting module 1260 illustrated in FIG. 12.

Figure 21:
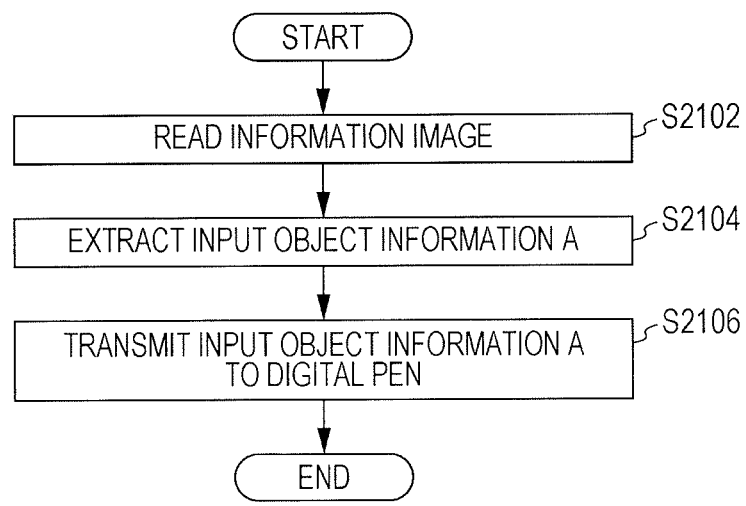
FIG. 21 is a flowchart illustrating an example of processing performed by a reader of the image reading apparatus (2) according to the exemplary embodiment.

FIG. 21 is a flowchart illustrating an example of processing performed by the reader 2300 of the image reading apparatus (2) according to the exemplary embodiment.

In step S2102, the reading module 2010A reads an information image.

In step S2104, the input object information extracting module 2024A extracts input object information A (first input object information).

In step S2106, the input object information extracting module 2024A transmits the input object information A (first input object information) to the digital pen 350.

Figure 22:
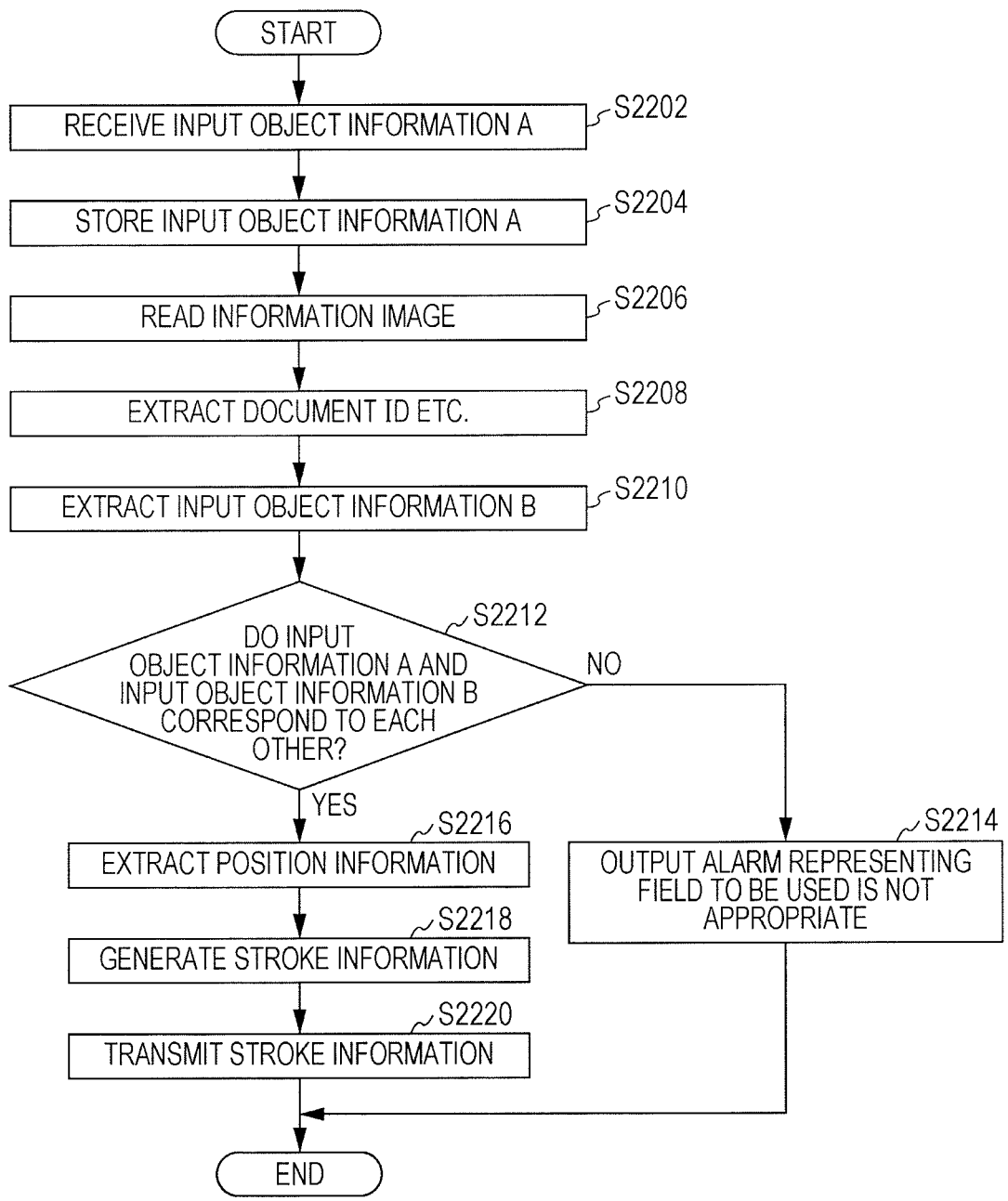
FIG. 22 is a flowchart illustrating an example of processing performed by a digital pen of the image reading apparatus (2) according to the exemplary embodiment.

FIG. 22 is a flowchart illustrating an example of processing performed by the digital pen 350 of the image reading apparatus (2) according to the exemplary embodiment.

In step S2202, the determination control module 2030 receives the input object information A (first input object information).

In step S2204, the input object information storage module 2032 stores the input object information A (first input object information).

In step S2206, the reading module 2010B reads an information image.

In step S2208, the document-related information extracting module 2026 extracts a document ID, etc.

In step S2210, the input object information extracting module 2024B extracts input object information (second input object information).

In step S2212, the determining module 2034 determines whether or not the input object information A (first input object) corresponds to the input object information B (second input object). If both the pieces of information correspond to each other, the process proceeds to step S2216. Otherwise, the process proceeds to step S2214.

In step S2214, the alarm module 2040 outputs an alarm representing that the field in which a user is going to input information is not an appropriate field.

In step S2216, the position information extracting module 2022 extracts position information.

In step S2218, the stroke information generating module 2050 generates stroke information.

In step S2220, the transmitting module 2060 transmits the stroke information.

Figure 23:
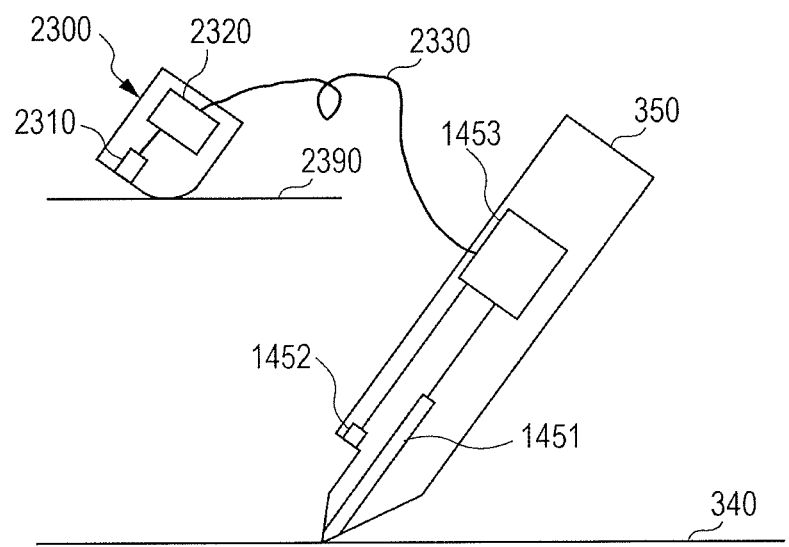
FIG. 23 is an explanatory diagram illustrating a second example structure of the digital and an example structure of the reader.

FIG. 23 is an explanatory diagram illustrating a second example structure of the digital pen 350 and an example structure of the reader 2300. The reader 2300 includes the image reading module 2310 and a control/transmission module 2320. The digital pen 350 includes the ink unit 1451, the image reading module 1452, and the control/transmission module 1453. The reader 2300 and the digital pen 350 are connected to each other via a connection cable 2330.

The reading module 2010A illustrated in FIG. 20 is realized by the image reading module 2310. The input object information extracting module 2024A is realized by the control/transmission module 2320. The reading module 2010B is realized by the image reading module 1452. The information image analyzing module 2020, the determination control module 2030, the alarm module 2040, the stroke information generating module 2050, and the transmitting module 2060 area realized by the control/transmission module 1453. Compared to the digital pen 350 illustrated in FIG. 14, the digital pen 350 illustrated in FIG. 23 does not have the switching button 1454. The image reading module 1452 and the control/transmission module 1453 perform processing equivalent to the processing performed by those illustrated in FIG. 14.

For example, an operator holds the reader 2300 in his/her left hand and the digital pen 350 in his/her right hand, and causes the reader 2300 to read a document-with-information-image 2390 (for example, the document-with-information-image 450 illustrated in FIG. 4B) and causes the digital pen 350 to read the document-with-information-image 340 (for example, the document-with-information-image 550 illustrated in FIG. 5B). Typically, the operator performs a reading operation with the reader 2300 and then performs a reading operation with the digital pen 350. Alternatively, the operator may perform a reading operation with the digital pen 350 while performing a reading operation with the reader 2300.

The image reading module 2310 is connected to the control/transmission module 2320, and performs processing equivalent to the processing performed by the image reading module 1452 of the digital pen 350. Note that the information image combined with the document-with-information-image 2390 read by the image reading module 2310 is embedded with first input object information.

The control/transmission module 2320 extracts first input object information from the information image read by the image reading module 2310, and transmits the first input object information to the control/transmission module 1453 of the digital pen 350.

The control/transmission module 1453 of the digital pen 350 and the control/transmission module 2320 of the reader 2300 are connected to each other via the connection cable 2330. The information image combined with the document-with-information-image 340 read by the image reading module 1452 is embedded with second input object information. The control/transmission module 1453 receives the first input object information from the control/transmission module 2320 of the reader 2300.

Hereinafter, an example hardware configuration of the information processing apparatus according to the exemplary embodiment (the image output apparatus, the document-creating information processing apparatus 310, the write-back information processing apparatus 360, and the image reading apparatus) will be described with reference to FIG. 25. The configuration illustrated in FIG. 25 is a configuration of a personal computer (PC) or the like, and includes a data reading unit 2517, such as a scanner, and a data output unit 2518, such as a printer. The digital pen 350 serving as the image reading apparatus is constituted by a subset of the image processing apparatus illustrated in FIG. 25, that is, a CPU 2501, a read only memory (ROM) 2502, a random access memory (RAM) 2503, the data reading unit 2517 (corresponding to the image reading module 1452), a communication unit 2516 (corresponding to part of the control/transmission module 1453), and a bus or the like for connecting these devices.

The CPU 2501 is a controller that executes processing in accordance with a computer program describing an execution sequence of the individual modules described above in the exemplary embodiment, that is, the input object information receiving module 110, the document layout receiving module 120, the document receiving module 130, the information image generating module 140, the information image combining module 150, the document creating application 312, the input object information specifying module 314, the stroke information extracting module 362, the write-back module 364, etc.

The ROM 2502 stores programs and operation parameters used by the CPU 2501. The RAM 2503 stores programs used for executing the CPU 2501, parameters that are changed as necessary in the execution, etc. These devices are connected to one another via a host bus 2504 constituted by a CPU bus or the like.

The host bus 2504 is connected to an external bus 2506, such as a peripheral component interconnect/interface (PCI) bus via a bridge 2505.

A keyboard 2508 and a pointing device 2509 such as a mouse are input devices operated by an operator. A display 2510 may be a liquid crystal display device or a cathode ray tube (CRT), and displays various pieces of information in the form of text or image information.

A hard disk drive (HDD) 2511 includes a hard disk, drives the hard disk, and causes a program executed by the CPU 2501 and information to be recorded or reproduced. A received electronic document, an information image, an electronic document combined with an information image, a document ID, etc. are stored in the hard disk. Furthermore, various computer programs, such as various data processing programs, are stored therein.

A drive 2512 reads data or a program recorded on a removable recording medium 2513, such as a magnetic disk, an optical disc, a magneto-optical disc, or a semiconductor memory, loaded in the drive 2512, and supplies the data or program to the RAM 2503 via an interface 2507, the external bus 2506, the bridge 2505, and the host bus 2504. The removable recording medium 2513 is usable as a data recording region similar to the hard disk.

A connection port 2514 is a port to which an external connection device 2515 is connected, and has a connection unit for USB, IEEE 1394, or the like. The connection port 2514 is connected to the CPU 2501, etc. via the interface 2507, the external bus 2506, the bridge 2505, and the host bus 2504. The communication unit 2516 is connected to a network and executes data communication processing with the outside. The data reading unit 2517 is a scanner, for example, and executes processing of reading a document. The data output unit 2518 is a printer, for example, and executes processing of outputting document data.

The hardware configuration of the image processing apparatus illustrated in FIG. 25 is one example configuration. The hardware configuration of the image processing apparatus is not limited to the configuration illustrated in FIG. 25, and another configuration may be employed as long as the modules described above in the exemplary embodiment may be executed therein. For example, some of the modules may be constituted by dedicated hardware (for example, application specific integrated circuit (ASIC) or the like), and some of the modules may be provided in an external system and may be connected via a communication line. Furthermore, plural apparatuses, each being the apparatus illustrated in FIG. 25, may be connected to one another via a communication line so as to operate in cooperation with one another. Alternatively, the apparatus illustrated in FIG. 25 may be incorporated into a copying machine, a facsimile machine, a scanner, a printer, or a multifunction apparatus (an image processing apparatus having two or more of a scanner function, a printer function, a copying function, a facsimile function, etc.).

The above-described program may be provided by being stored in a recording medium or via a communication medium. In that case, the above-described program may be regarded as a "computer readable recording medium having the program recorded thereon".

The "computer readable recording medium having the program recorded thereon" is a computer readable recording medium that has the program recorded thereon and that is used for installation, execution, or distribution of the program.

Examples of the recording medium include digital versatile discs (DVDs), for example, a DVD-R, a DVD-RW, a DVD-RAM, etc. based on the standard designed by the DVD forum, and a DVD+R, a DVD+RW, etc. based on the standard designed by DVD+RW. Also, examples of the recording medium include compact discs (CDs), for example, a CD-ROM, a CD recordable (CD-R), a CD rewritable (CD-RW), etc. Furthermore, examples of the recording medium include a Blu-ray Disc (registered trademark), a magneto-optical (MO) disc, a flexible disk (FD), magnetic tape, a hard disk, a ROM, an electrically erasable and programmable ROM (EEPROM (registered trademark)), a flash memory, a RAM, etc.

The above-described program or part of the program may be stored or distributed while being recorded on the recording medium. Alternatively, the program or part of the program may be transmitted via a wired network, such as a local area network (LAN), a metropolitan area network (MAN), a wide area network (WAN), the Internet, an intranet, or an extranet, or via a wireless communication network. Furthermore, the program or part of the program may be transmitted using a transmission medium including a combination of the foregoing media, or may be transmitted using carrier waves.

Furthermore, the foregoing program may be part of another program, and may be recorded on a recording medium together with another program. Also, the program may be recorded on plural recording media in a divided manner. The program may be recorded in any form, for example, in a compressed or encrypted form, as long as the program may be decompressed or decrypted.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
   an image output apparatus; and
   an image reading apparatus,
   the image output apparatus including
      an input object information receiving unit that receives first input object information, which is information about an input object in a document,
      a first information image generating unit that generates a first information image, which is an image representing information, on the basis of the first input object information received by the input object information receiving unit,
      a second information image generating unit that generates a second information image, which is an image representing information, on the basis of position information representing a position in the document and second input object information corresponding to the first input object information received by the input object information receiving unit,
      a first combining unit that combines the first information image generated by the first information image generating unit with the document,
      a second combining unit that combines the second information image generated by the second information image generating unit with a document, and
      a first output unit that outputs the document combined with the first information image by the first combining unit and the document combined with the second information image by the second combining unit onto respective media, or that outputs a document combined with the first information image and the second information image onto a medium,
   the image reading apparatus including
      a first reading unit that reads an information image that has been output onto a medium by the image output apparatus and that includes first input object information,
      a second reading unit that reads an information image that has been output onto a medium by the image output apparatus and that includes position information and second input object information,
      an extracting unit that analyzes the information image read by the first reading unit and the information image read by the second reading unit, thereby extracting the first input object information and the second input object information, and
      a determining unit that compares the first input object information and the second input object information extracted by the extracting unit, thereby determining whether or not the second input object information corresponds to the first input object information.

2. The image processing apparatus according to claim 1, further comprising:
   a warning unit that outputs a warning representing that a position where reading has been performed by the second reading unit does not correspond to a position where reading has been performed by the first reading unit if the determining unit determines that the second input object information does not correspond to the first input object information.

3. The image processing apparatus according to claim 2, further comprising:
   a writing tool controller that controls the writing tool not to perform writing if the determining unit determines that the second input object information does not correspond to the first input object information.

4. The image processing apparatus according to claim 3, further comprising:
   a position information extracting unit that analyzes the information image read by the second reading unit, thereby extracting position information;
   a second output unit that outputs the position information extracted by the position information extracting unit; and
   an output controller that performs control so that the position information extracted by the position information extracting unit is not output to the second output unit if the determining unit determines that the second input object information does not correspond to the first input object information.

5. The image processing apparatus according to claim 2, further comprising:
   a position information extracting unit that analyzes the information image read by the second reading unit, thereby extracting position information;
   a second output unit that outputs the position information extracted by the position information extracting unit; and
   an output controller that performs control so that the position information extracted by the position information extracting unit is not output to the second output unit if the determining unit determines that the second input object information does not correspond to the first input object information.

6. The image processing apparatus according to claim 1, further comprising:
   a writing tool controller that controls a writing tool not to perform writing if the determining unit determines that the second input object information does not correspond to the first input object information.

7. The image processing apparatus according to claim 6, further comprising:
   a position information extracting unit that analyzes the information image read by the second reading unit, thereby extracting position information;
   a second output unit that outputs the position information extracted by the position information extracting unit; and
   an output controller that performs control so that the position information extracted by the position information extracting unit is not output to the second output unit if the determining unit determines that the second input object information does not correspond to the first input object information.

8. The image processing apparatus according to claim 1, further comprising:
a position information extracting unit that analyzes the information image read by the second reading unit, thereby extracting position information;
a second output unit that outputs the position information extracted by the position information extracting unit; and
an output controller that performs control so that the position information extracted by the position information extracting unit is not output to the second output unit if the determining unit determines that the second input object information does not correspond to the first input object information.

9. The image processing apparatus according to claim 1, wherein the first reading unit and the second reading unit read an information image using an identical reader,
the image processing apparatus further comprising:
a controller that performs control so that the information image read by using the reader is read as an information image embedded with the first input object information or an information image embedded with the second input object information in accordance with an operation performed by an operator.

10. An image processing apparatus comprising:
an input object information receiving unit that receives first input object information that identifies a first document object and second input object information that identifies a second document object at a position in a document at which information is to be handwritten on the document by an input device of a user, the first document object and the second document object having a linked relationship that indicates whether reading of the first document object by the input device and reading of the second document object at the location by the input device are sequentially performed to enable the input device to add the handwritten information to the document;
a first information image generating unit that generates a first information image, the first information image comprising a two-dimensional machine-readable code of the first object information;
a second information image generating unit that generates a second information image, the second information image comprising a two-dimensional machine-readable code of the second object information;
a first combining unit that embeds the first information image generated by the first information image generating unit with one of (i) first document data of a first document including the first document object and excluding the second document object and (ii) combined document data of a combined document including the first document object and the second document object;
a second combining unit that embeds the second information image generated by the second information image generating unit with one of (i) second document data of a second document including the second document object and excluding the first document object and the combined document data of the combined document including the first document object and the second document object; and
an output unit that outputs one of (i) the combined document including the first document object, the second document object, the embedded first information image, and the embedded second information image and (ii) the first document including the first document object and excluding the second document object embedded first information image and the second document including the second document object and excluding the first document object having the embedded second information image.

11. A non-transitory computer readable medium storing an image processing program causing a computer to execute a process, the process comprising:
receiving first input object information that identifies a first document object and second input object information that identifies a second document object at a position in a document at which information is to be handwritten on the document by an input device of a user, the first document object and the second document object having a linked relationship that indicates whether reading of the first document object by the input device and reading of the second document object at the location by the input device are sequentially performed to enable the input device to add the handwritten information to the document;
generating a first information image, the first information image comprising a two-dimensional machine-readable code of the first object information;
generating a second information image, the second information image comprising a two-dimensional machine-readable code of the second object information;
embedding the first information image with one of (i) first document data of a first document including the first document object and excluding the second document object and (ii) combined document data of a combined document including the first document object and the second document object;
embedding the second information image with one of (i) second document data of a second document including the second document object and excluding the first document object and (ii) the combined document data of the combined document including the first document object and the second document object; and
outputting one of (i) the combined document including the first document object, the second document object, the embedded first information image, and the embedded second information image and (ii) the first document including the first document object and excluding the second document object having the embedded first information image and the second document including the second document object and excluding the first document object having the embedded second information image.

12. An image processing method comprising:
receiving first input object information, which is information about an input object in a document;
generating a first information image, which is an image representing information, on the basis of the received first input object information;
generating a second information image, which is an image representing information, on the basis of position information representing a position in the document and second input object information corresponding to the received first input object information;
combining the generated first information image with the document;
combining the generated second information image with a document;
outputting the document combined with the first information image and the document combined with the second information image onto respective media, or outputting a document combined with the first information image and the second information image onto a medium;

reading the first information image that has been output onto a medium and that includes the first input object information;

reading the second information image that has been output onto a medium and that includes the position information and the second input object information;

analyzing the first information image and the second information image, thereby extracting the first input object information and the second input object information; and comparing the extracted first input object information and second input object information, thereby determining whether or not the second input object information corresponds to the first input object information.

* * * * *